(12) United States Patent
Asai

(10) Patent No.: US 6,398,295 B2
(45) Date of Patent: Jun. 4, 2002

(54) ATTACHMENT DEVICES

(75) Inventor: Takashi Asai, Toyota (JP)

(73) Assignee: Neo-Ex Lab, Inc., Toyota (JP)

( * ) Notice: Subject to any disclaimer, the term of this patent is extended or adjusted under 35 U.S.C. 154(b) by 0 days.

(21) Appl. No.: 09/804,182

(22) Filed: Mar. 13, 2001

(30) Foreign Application Priority Data

Mar. 15, 2000 (JP) ........................................ 2000-072664
Mar. 28, 2000 (JP) ........................................ 2000-089426

(51) Int. Cl.[7] .............................. B60J 3/00; B60R 13/01
(52) U.S. Cl. ..................... 296/214; 296/97.9; 296/146.7
(58) Field of Search ............................... 296/214, 97.9, 296/146.7; 248/27.3, 247, 288.1, 289.1

(56) References Cited

U.S. PATENT DOCUMENTS

| 3,918,130 | A |   | 11/1975 | Poe |   |
|---|---|---|---|---|---|
| 4,927,287 | A |   | 5/1990 | Ohkawa et al. |   |
| 4,989,911 | A | * | 2/1991 | Van Order | 296/97.9 |
| 5,269,060 | A |   | 12/1993 | Dowd et al. |   |
| 5,507,545 | A | * | 4/1996 | Krysiak | 296/97.9 |
| 5,850,676 | A |   | 12/1998 | Takahashi et al. |   |
| 6,003,928 | A |   | 12/1999 | Curtindale |   |
| 6,068,323 | A | * | 5/2000 | Brown et al. | 296/97.9 |
| 6,179,366 | B1 | * | 1/2001 | Hansz | 296/97.9 |
| 6,234,558 | B1 | * | 5/2001 | Curtindale | 296/97.9 |

FOREIGN PATENT DOCUMENTS

| EP | 0688697 | 12/1995 |
| JP | 0911752 | 1/1997 |
| JP | 1178521 | 3/1999 |

* cited by examiner

Primary Examiner—Joseph D. Pape
Assistant Examiner—Greg Blankenship
(74) Attorney, Agent, or Firm—Dennison, Schultz & Dougherty

(57) ABSTRACT

Attachment devices are taught that preferably include a main body, a first engagement mechanism provided on the main body, and a second engagement mechanism provided on the main body. The attachment device is attached to a panel lining sheet by engaging the first engagement mechanism with a receiving hole, to thereby produce a panel lining sheet assembly. After the panel lining sheet assembly is overlaid on a vehicle panel, the attachment device is attached to the vehicle panel by engaging the second engagement mechanism with a mounting hole of the vehicle panel. Thus, the attachment device can be secured to the vehicle panel with the panel lining sheet interleaved between the attachment device and the vehicle panel.

21 Claims, 15 Drawing Sheets

ATTACHMENT DEVICES

BACKGROUND OF THE INVENTION

1. Field of the Invention

The present invention relates to attachment devices that can be attached to panels, e.g. roof panels, front header panels and other vehicle body panels. More particularly, the present invention relates to attachment devices that can be attached to the vehicle panel in order to secure accessory members, e.g. a sun visor, a sun visor holder, a mirror, an assist grip and other such members, to the vehicle panel, to thereby attach vehicle lining sheets to the panels. These attachment members may be designed, e.g., as a sun visor mounting bracket, a room mirror mounting bracket, an assist grip mounting bracket, a sun visor holder unit, and other such members.

2. Description of the Related Art

A front header panel for a vehicle generally includes a panel lining sheet. Typically, the panel lining sheet is attached to the front header panel by utilizing accessory members that are usually secured to the front header panel by screws or other such fasteners.

Generally, the panel lining sheet is overlaid on the front header panel and is temporarily attached thereto. Subsequently, the accessory members, for example, a sun visor or a sun visor holder, are positioned on the panel lining sheet. The accessory members are secured to the front header panel by screws or fixture pins, so as to attach the sun visor and the sun visor holder to the front header panel. The panel lining sheet is interleaved between the front header panel and the accessory members.

However, known accessory members must be manually retained in place on the panel lining sheet, or by utilizing another retainer means, when known accessory members are attached to the front header panel using screws. Thus, the attachment operation is labor-intensive and time consuming when the accessory members are not adapted to be previously attached to the panel lining sheet.

Japanese Laid-open Patent Application Number 11-78521 purports to describe an improved method for attaching a panel lining sheet to a front header panel. In this known method, accessory members (a sun visor and a sun visor holder) are previously attached to the panel lining sheet using screws, so as to form a panel lining sheet assembly. The panel lining sheet assembly includes attachment devices or fixture clips that can be inserted into corresponding mounting holes formed in the front header panel and are adapted to elastically engage the mounting holes. Further, the fixture clips are simultaneously attached to the inner surface of the panel lining sheet using screws when the accessory members are attached to the panel lining sheet. The resulting panel lining sheet assembly is overlaid on the front header panel and then the fixture clips provided thereon are pressed into the mounting holes. Thus, the accessory members are attached to the front header panel and the panel lining sheet is securely interleaved between the accessory members and the front header panel.

According to this known technique, it is not necessary to retain the accessory members in place on the panel lining sheet when the accessory members are attached to the front header panel. Instead, the accessory members are pre-assembled with the panel lining sheet, so as to form the panel lining sheet assembly. In addition, the panel lining sheet assembly can be easily attached to the front header panel in one operation by attaching the accessory members to the front header panel. This assembly is accomplished by simply pushing the fixture clips into the mounting holes of the front header panel after the panel lining sheet assembly is overlaid on the front header panel. Thus, the panel lining sheet is securely attached to the front header panel by means of the attached accessory members and the panel lining sheet can be attached to the front header panel relatively easily and quickly.

However, in this known technique, in order to prepare the panel lining sheet assembly, the fixture clips and the accessory members are separately arranged on the panel lining sheet, and are pre-assembled with the panel lining sheet by using common screws. Therefore, time consuming and labor intensive work is still required to prepare the panel lining sheet assembly.

SUMMARY OF THE INVENTION

It is, accordingly, an object of the present teachings to teach improved attachment devices that overcome the one or more problems of the known attaching devices.

In one aspect of the present teachings, improved attachment devices can be utilized to a vehicle lining sheet to a vehicle panel. In another aspect of the present teachings, improved methods for attaching a vehicle lining sheet to a vehicle panel are taught that will overcome one or more problems of known attaching methods.

In another aspect of the present teachings, attachment devices are taught that may include a first engagement means provided on a main body. As the first engagement means is pushed into a receiving hole of a vehicle lining sheet, this first engagement means elastically engages the receiving hole, so as to form a vehicle lining sheet assembly that comprises the vehicle lining sheet and the attachment devices. The attachment devices also may include a second engagement means provided on the main body. The second engagement means may be pushed into a mounting hole of a vehicle panel after the vehicle lining sheet is overlaid on the vehicle panel. The second engagement means may preferably elastically engage the mounting hole, so that the attachment devices are mounted on the vehicle panel. The vehicle lining sheet will be interposed between the attachment devices and the vehicle panel. As a result, the vehicle lining sheet is attached to the vehicle panel at the time the attachment devices are installed.

Thus, attachment devices can be attached to a vehicle lining sheet in one simple operation by pressing a first engagement means of the attachment devices into a receiving hole of a vehicle lining sheet, so as to form a vehicle lining sheet assembly. Also, the attachment devices can be attached to a vehicle panel in one simple operation by pressing a second engagement means of the attachment devices into a mounting hole of a vehicle panel, so as to attach the vehicle lining sheet on the vehicle panel.

Because this design is superior to known attachment device, the panel lining sheet assembly, which may comprise the vehicle lining sheet and the attachment devices, can be easily manufactured. Further, the resulting panel lining sheet assembly can be easily and quickly attached to the vehicle panel. Thus, the present attachment devices minimize manual labor required to install the vehicle accessories and vehicle lining sheet on the vehicle panel and provide a substantial improvement over known attachment devices.

Additional objects, features and advantages of the present invention will be readily understood after reading the following detailed description together with the accompanying drawings and the claims.

DETAILED DESCRIPTION OF THE INVENTIONS

Figure 1:
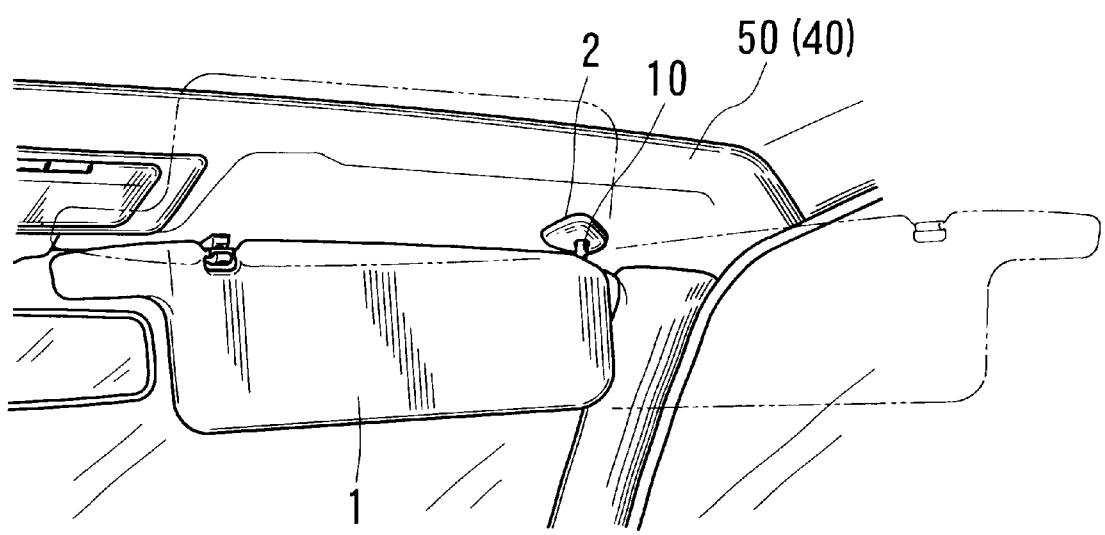
FIG. 1 is a perspective view of a sun visor that is attached to a front header panel with a panel lining sheet by utilizing a bracket assembly according to a first representative embodiment of the present teachings.

Attachment devices are generally taught that may include a main body and a first engagement means disposed on the main body. Preferably, the first engagement means is adapted to engage a receiving hole of a lining sheet. A second engagement means also may be provided on the main body and the second engagement means is preferably adapted to engage a mounting hole of a panel. Although the present attachment devices are not limited in to any particular use or application, the attachment devices may preferably be utilized to body attaching a vehicle lining sheet to a vehicle panel. Moreover, the present attachment devices are preferably connected to a vehicle accessory, such a sun visor, in order to simply the installation of the sun visor and the vehicle lining sheet on the vehicle panel.

The first engagement means may preferably include a flexible engagement strip that can elastically engage the receiving hole of the vehicle lining sheet. This flexible engagement strip may serve to retain the main body on the vehicle lining sheet. The second engagement means may include a flexible engagement member that can elastically engage the mounting hole of the vehicle panel. This flexible engagement member may serve to secure the main body to the vehicle panel with the vehicle lining sheet inserted between the attachment device and the vehicle panel.

The engagement strip may optionally include an engagement lip that is adapted to elastically engage the receiving hole of the vehicle lining sheet. Further, the engagement strip may include an acute-angled portion, which acute-angled portion may elastically flex when it is inserted into the receiving hole of the vehicle lining sheet.

The engagement member may include a pair of engagement bars that are oppositely disposed in a spaced relationship. The engagement bars may be adapted to elastically engage the mounting hole of the vehicle panel. The attachment device may also include a lock (or locking means) that is adapted to be received between the engagement bars. For example, the engagement bars may spread when the locking means is inserted into the space between the engagement bars. This insertion may change the lock (or locking means) to an operational position from a non-operational position. The engagement bars may reliably engage the mounting hole of the vehicle panel. Further, the attachment device also may include a cover member and the lock (or locking means) may be provided on the cover member. The lock (or locking means) may be inserted into the space between the engagement bars when the cover member is pressed toward the main body.

A retainer (or retainer means) may be provided to retain the lock (or locking means) in the operational position and/or the non-operational position. The retainer (or retainer means) may include, for example, an engagement rib provided on the main body and two engagement grooves provided on the lock (or locking means). The engagement rib may engage the engagement grooves to thereby retain the lock (or locking means) in the operational position or the non-operational position.

The attachment device may include three flexible engagement strips that are equally spaced at angle of 120°.

In other preferred aspects of the present teachings, attachment devices according to any of the embodiments described above and below may be designed as a sun visor mounting bracket. The main body of the attachment device may include, for example, a base portion and a split tubular boss portion that is integrally formed on the base portion.

Preferably, the tubular boss portion is adapted to receive a support arm of a sun visor. In an alternate embodiment of the present teachings, the attachment device may be designed as a sun visor holder unit. In this case, an integral holder hook may be incorporated with the main body and the holder hook may be adapted to receive a retainer portion of a sun visor.

Improved methods for attaching a lining sheet to a panel are also taught. For example, the first engagement means provided on the main body of the attachment device of any of the above or below embodiments may be engage with a receiving hole of the lining sheet. Thus, lining sheet assembly may be prepared that includes, e.g., the panel lining sheet and the attachment device. Thereafter, the lining sheet assembly may be disposed proximally to the panel. At this time, the second engagement means provided on the main body may engage a mounting hole of the panel. As a result, the attachment device can be easily and reliably attached to the panel and the panel lining sheet will be interleaved between the main body and the panel.

Although the present methods are not limited to any particular application, the lining sheet may preferably be a vehicle lining sheet and the panel may preferably be a vehicle panel. In further preferred embodiments of the present teachings, the present methods may be utilized to attach an attachment device that has been designed as a sun visor mounting bracket to the vehicle panel. In this case, the sun visor mounting bracket may be coupled to a support arm of a sun visor. As a result, the vehicle lining sheet assembly may include the sun visor. In the alternative, the present methods may be preferably utilized to attach an attachment device that has been designed as a sun visor holder unit to a vehicle panel. In this case, a holder hook may be integrally provided with the main body and the holder hook may be adapted to receive a retainer portion of a sun visor.

Additional representative examples of the present teachings will be described in greater detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the above detail description may not be necessary to practice the invention in the broadest sense, and are instead taught merely to particularly describe some representative examples of the invention. In addition, the present teachings naturally may be combined in ways that are not specifically enumerated in order to provide additional useful embodiments of the present teachings.

Two detailed representative embodiments of the present teachings are shown in FIGS. 1 to 19, in which a mounting bracket assembly and a holder unit of a vehicle sun visor are described as examples of an attachment device that can be prepared utilizing the present teachings. However, before describing these two representative embodiments in detail, a summary of the two representative embodiments will be provided.

As shown in FIG. 1, a representative vehicle sun visor 1 is mounted on a vehicle panel or front header panel 50 by attaching a mounting bracket assembly 2 to the front header panel 50. As will be appreciated, the bracket assembly 2 is rotatably coupled to an L-shaped metal support arm 10 of the sun visor 1. Preferably, the bracket assembly 2 is previously attached to a vehicle lining sheet or panel lining sheet 40 and then is attached to the front header panel 50 with the lining sheet 40.

Figure 2:
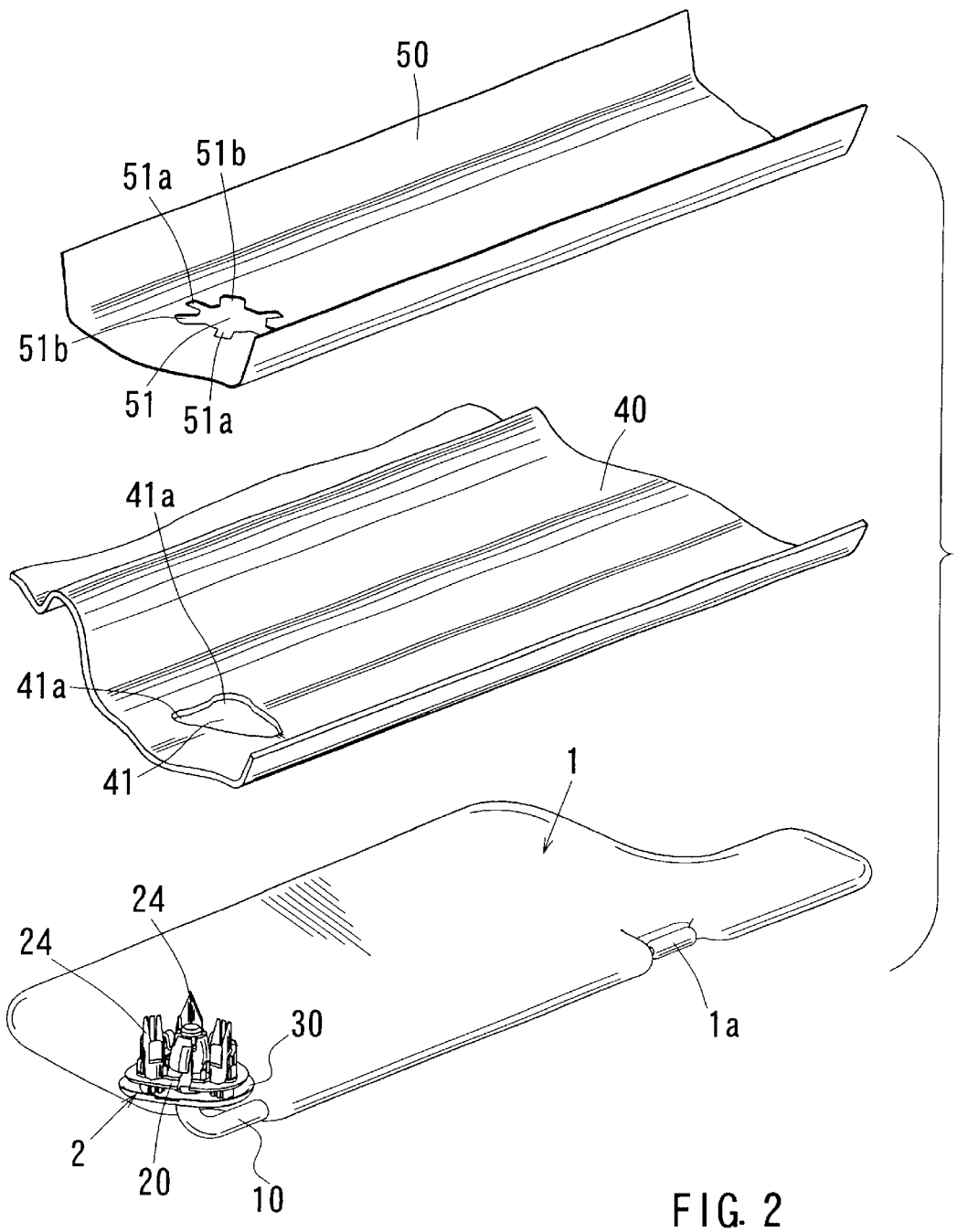
FIG. 2 is an exploded perspective view of the front header panel, the panel lining sheet and the sun visor.

As shown in FIG. 2, the sun visor 1 of the first detailed representative embodiment is attached to the panel lining sheet 40 by pressing a substantial portion of the bracket assembly 2 into a receiving hole 41 formed in the panel lining sheet 40. A first engagement means engages the receiving hole 41. Thus, a panel lining sheet assembly may be produced as that includes panel lining sheet 40 and the sun visor 1 and the panel lining sheet assembly may be combined with the panel lining sheet 40 by bracket assembly 2. Thereafter, the panel lining sheet assembly may be placed or overlaid on the front header panel 50. A substantial portion of the bracket assembly 2 may then be pressed into a mounting hole 51 formed in the front header panel 50 in order to attach the bracket assembly 2 to the front header panel 50. As a result, the sun visor 1 may be mounted on the front header panel 50 and the panel lining sheet 40 may be interposed between the front header panel 50 and the attached bracket assembly 2. Thus, the panel lining sheet assembly is attached to the front header panel 50. That is, the panel lining sheet 40 is attached to the front header panel 50 by means of the attached sun visor 1. Further, the receiving hole 41 of the panel lining sheet 40 and the mounting hole 51 of the front header panel 50 are pre-formed to special shapes, respectively, which will be described below in further detail.

By utilizing bracket assembly 2, the panel lining sheet assembly, which comprises the sun visor 1 and the panel lining sheet 40, can be easily and quickly prepared by simply pressing the substantial portion of the bracket assembly 2 into the receiving hole 41 of the panel lining sheet 40. Also, the resulting panel lining sheet assembly can be easily attached to the front header panel 50 by mounting the sun visor 1 on the front header panel 50. This mounting may be accomplished by simply pressing the substantial portion of the bracket assembly 2 into the mounting hole 51 of the front header panel 50 after the panel lining sheet assembly has been placed or overlaid on the front header panel 50. Thus, the panel lining sheet 40 can be easily and quickly attached to the front header panel 50. Therefore, time-consuming and labor intensive work is not required to prepare the panel lining sheet assembly or to attach the panel lining sheet 40 to the front header panel 50.

Figure 10:
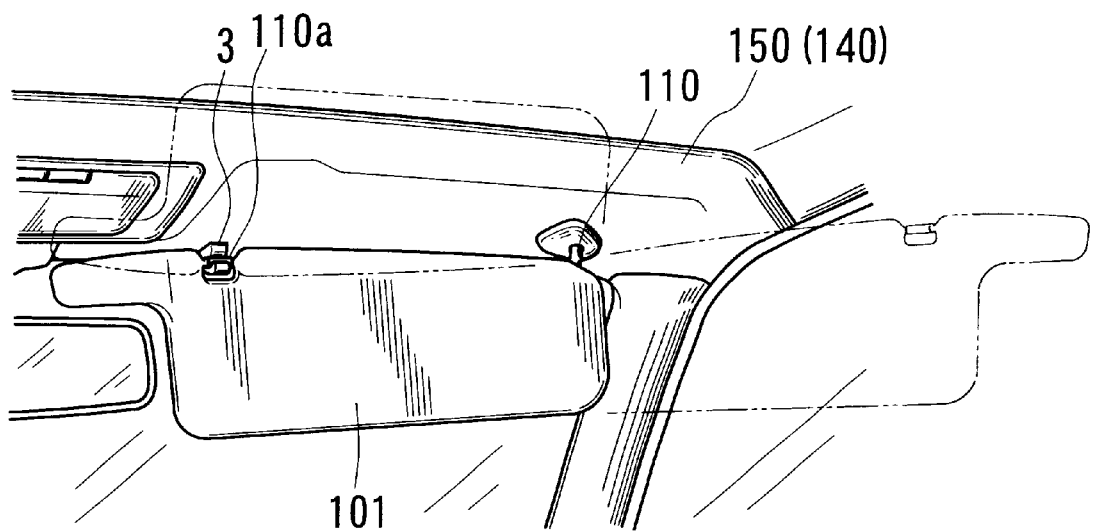
FIG. 10 is a perspective view of a sun visor holder unit according to a second representative embodiment of the present teachings that is attached to a front header panel with a panel lining sheet.

FIG. 10 shows a representative sun visor holder unit 3 according to a second embodiment of the present teachings. This representative sun visor holder unit 2 may be attached to a front header panel 150 in order to support a retainer portion 110a of a sun visor 101. Preferably, the holder unit 3 may be previously attached to a panel lining sheet 140 and then attached to the front header panel 150 with the lining sheet 140.

Figure 11:
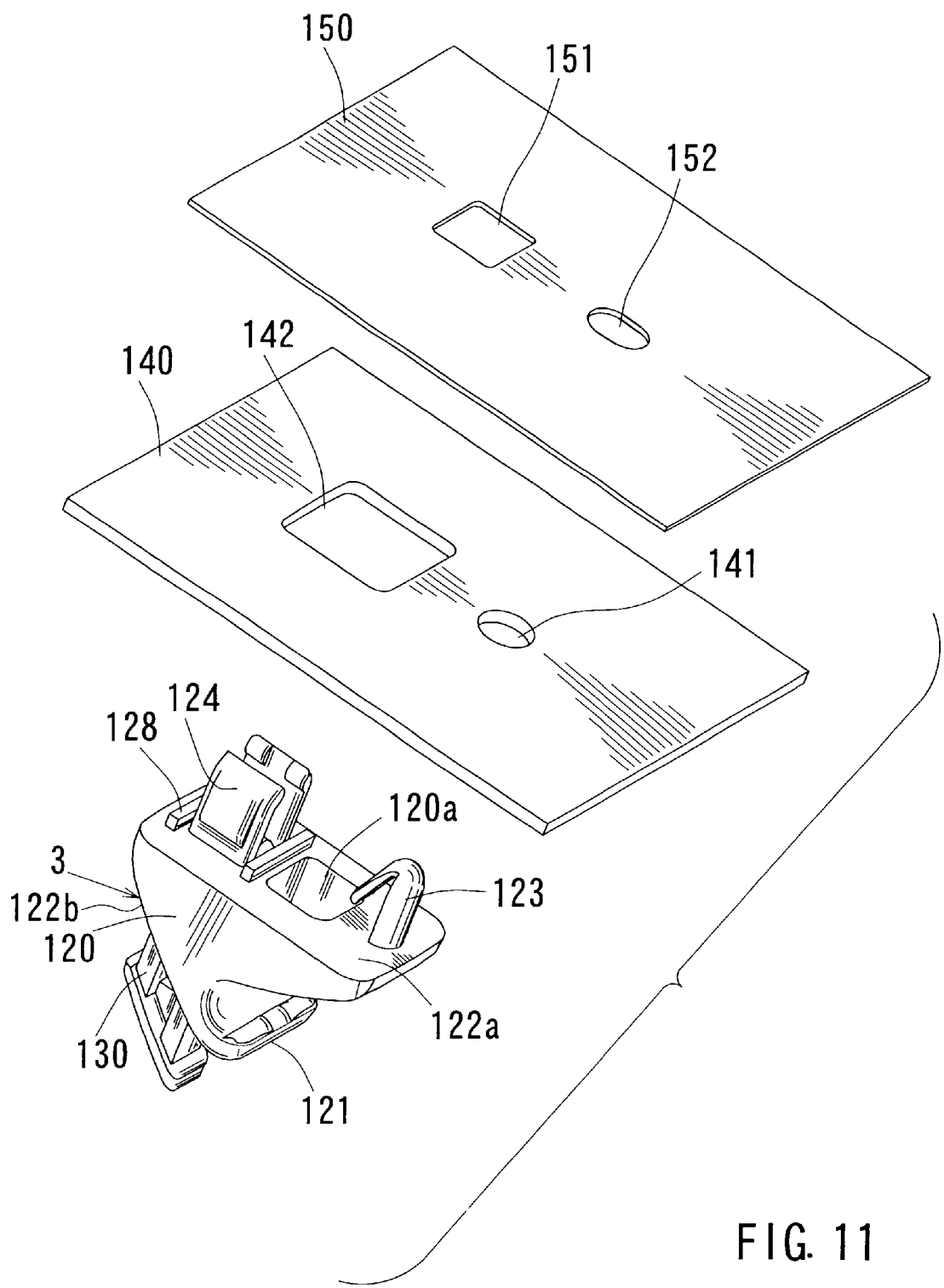
FIG. 11 is an exploded perspective view of the front header panel, the panel lining sheet and the representative sun visor holder unit.
Figure 12:
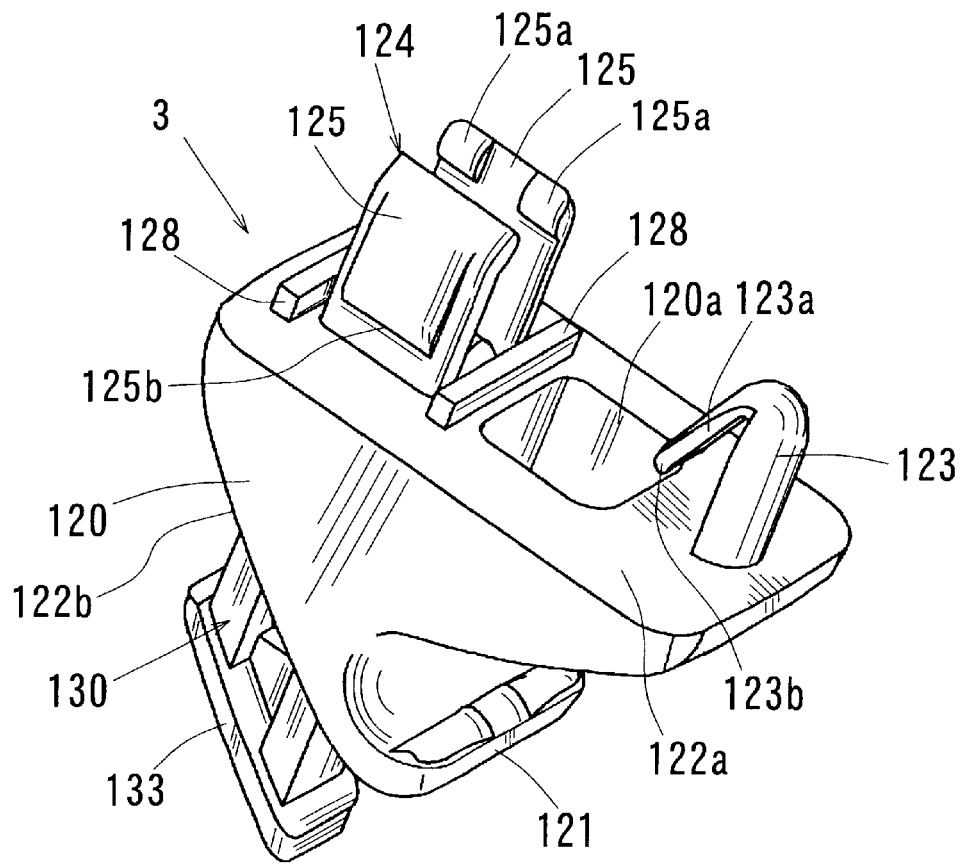
FIG. 12 is a perspective view of the representative sun visor holder unit.

As shown in FIG. 11, the holder unit 3 may be attached to the panel lining sheet 140 all by pressing a first engagement means of the holder unit 3 into a receiving hole 141 formed in the panel lining sheet 140. Consequently, a panel lining sheet assembly is produced that comprises the panel lining sheet 140 and the holder unit 3, in which the holder unit 3 is combined with the panel lining sheet 140. Thereafter, the panel lining sheet assembly may be placed or overlaid on the front header panel 150 and then a second engagement means of the holder unit 3 is pressed into a mounting hole 151 formed in the front header panel 150. Thus, the holder unit 3 may be attached to the front header panel 150 with the panel lining sheet 140 interleaved between the front header panel 150 and the holder unit 3. As a result, the panel lining sheet assembly can be easily and reliably attached to the front header panel 150. That is, the panel lining sheet 140 is attached to the front header panel 150 by virtue of the attached holder unit 3. Further, the receiving hole 141 of the panel lining sheet 140 and the mounting hole 151 of the front header panel 150 are preformed in desired shapes and arrangement, respectively, which will be described below in further detail.

By utilizing sun visor holder unit 3, the panel lining sheet assembly, which comprises the holder unit 3 and the panel lining sheet 140, can be easily and quickly prepared by simply pressing the first engagement means of the holder unit 3 into the receiving hole 141 of the panel lining sheet 140. Also, the resulting panel lining sheet assembly can be easily attached to the front header panel 150 by simply pressing the second engagement means of the holder unit 3 into the mounting hole 151 of the front header panel 50 after the panel lining sheet assembly has been placed or overlaid on the front header panel 150. Thus, the panel lining sheet 140 can be easily and quickly attached to the front header panel 150. Therefore, time-consuming or labor intensive work is not required to prepare the panel lining sheet assembly or to attach the panel lining sheet 140 to the front header panel 150.

FIRST DETAILED REPRESENTATIVE EMBODIMENT

Figure 3:
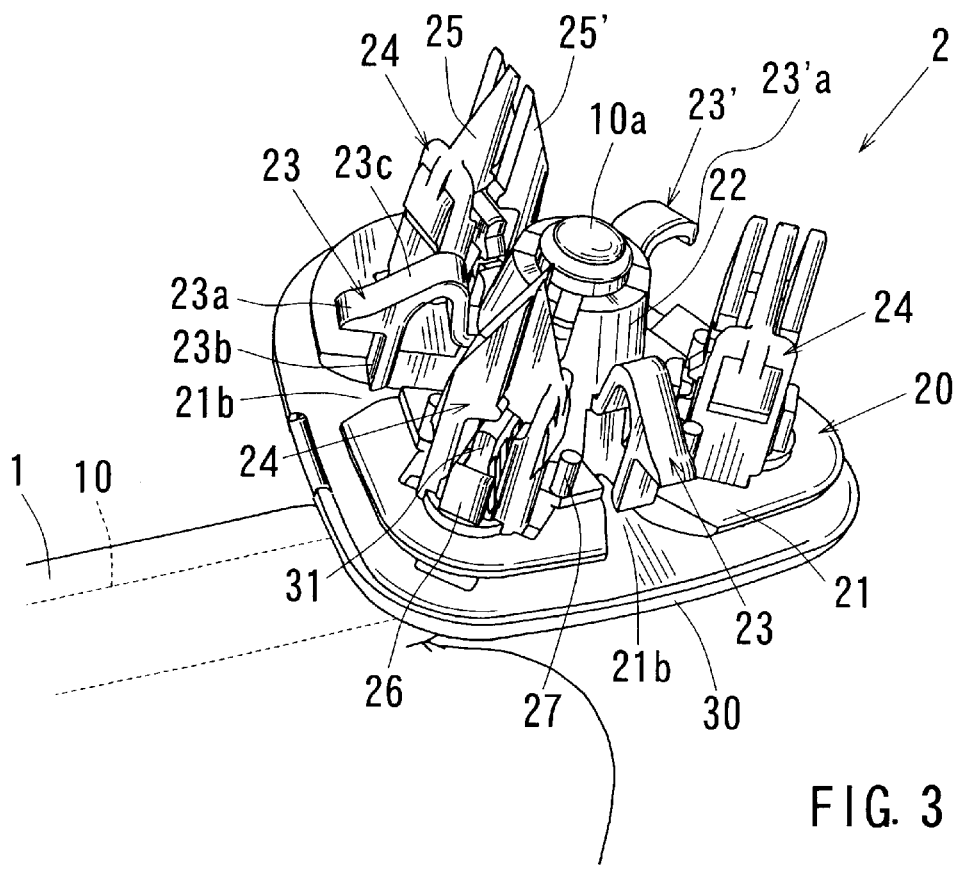
FIG. 3 is a perspective view of a representative bracket assembly.
Figure 4:
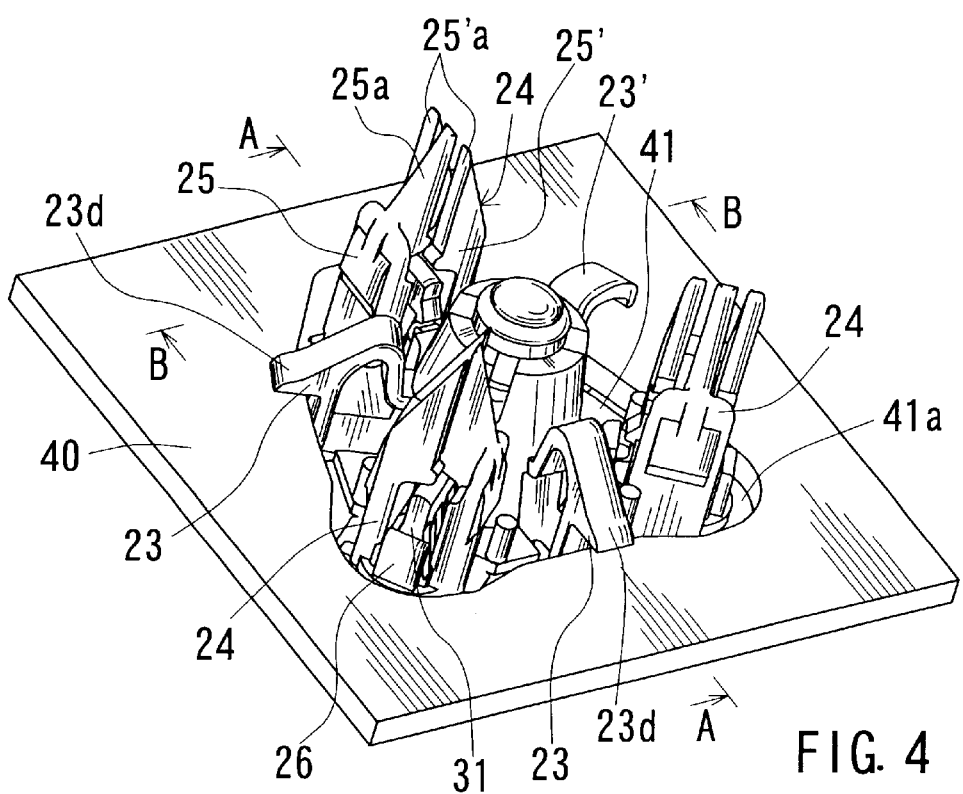
FIG. 4 is a perspective view of the representative bracket assembly after it has been attached to the panel lining sheet.
Figure 5:
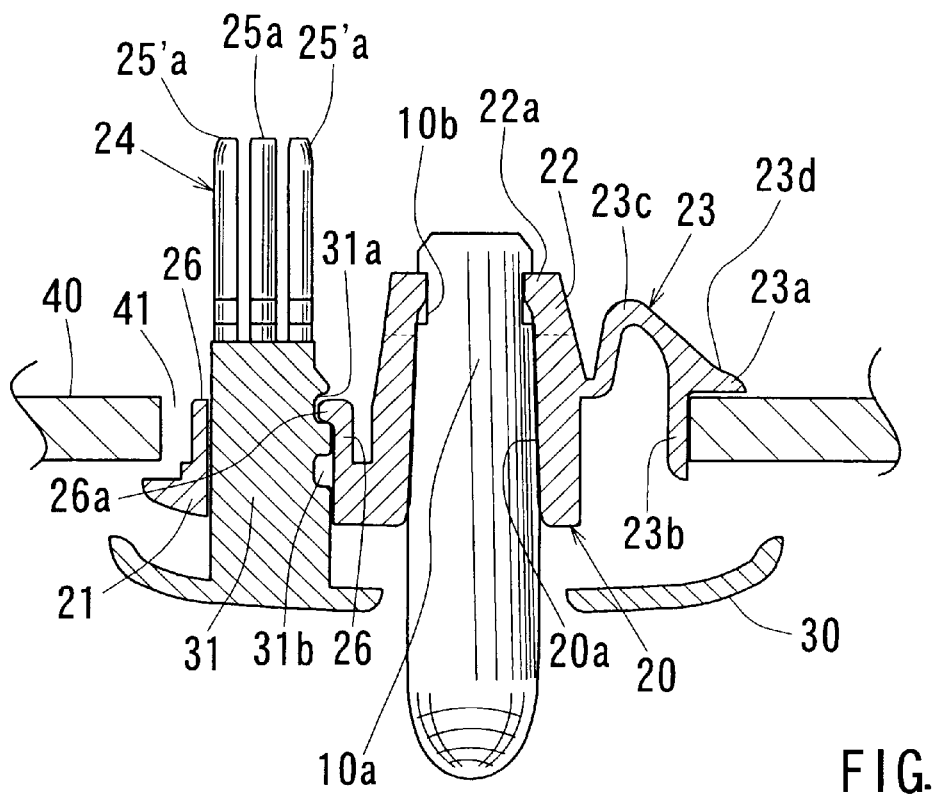
FIG. 5 is a cross-sectional view taken along line A—A of FIG. 4.
Figure 8:
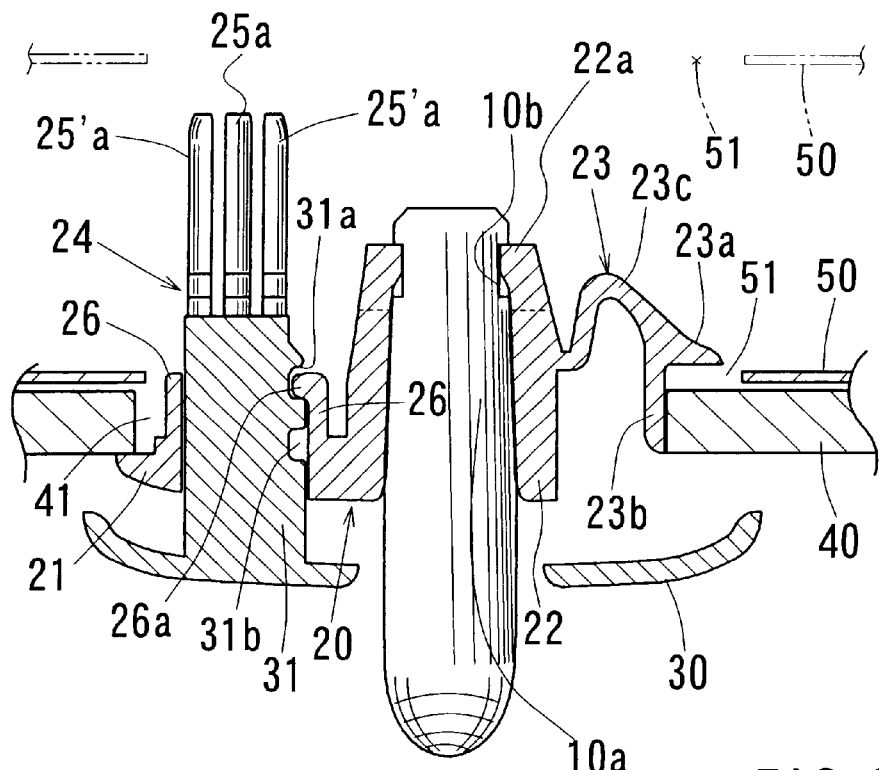
FIG. 8(A) is a cross-sectional view taken along line C—C of FIG. 7 before an engagement pin of a bracket cover is inserted between engagement strips of a bracket body.
FIG. 8(B) is a cross-sectional view taken along line C—C of FIG. 7 after the engagement pin is inserted between the engagement strips.
Figure 8:
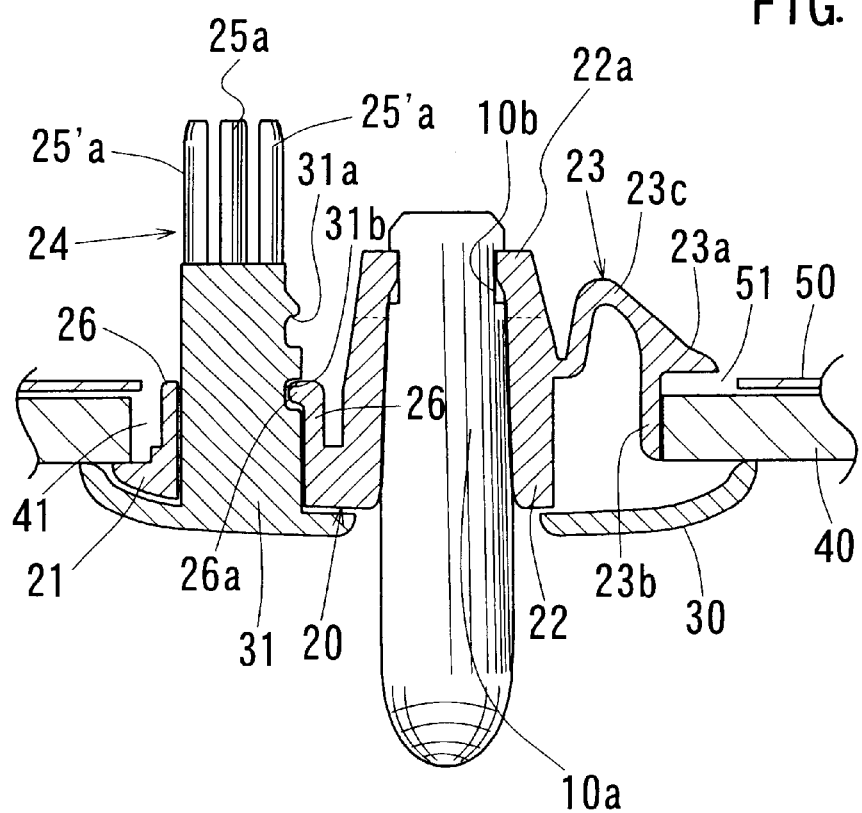
Figure 9:
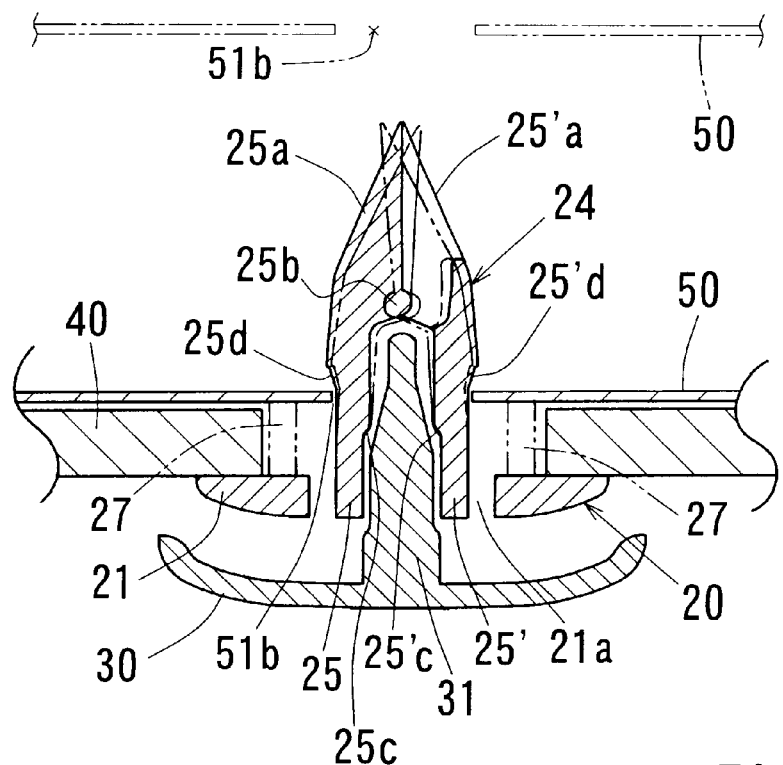
FIG. 9(A) is a cross-sectional view taken along line D—D of FIG. 7 before the engagement pin is inserted between the engagement strips.
FIG. 9(B) is a cross-sectional view taken along line D—D of FIG. 7 after the engagement pin is inserted between the engagement strips.
Figure 9:
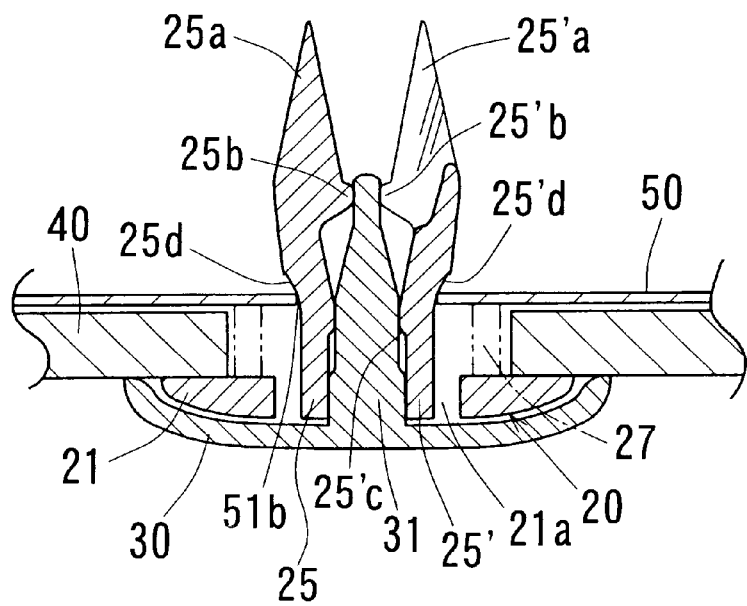

The first detailed representative embodiment will now described in detail with reference to FIGS. 1 to 9(B). As shown in FIG. 2, the bracket assembly 2 includes a resin molded bracket body 20 and a resin molded cover member or bracket cover 30. The bracket body 20 comprises a rounded equilateral triangular base portion 21 and a tubular boss portion 22. As shown in FIGS. 5, 8(A) and 8(B), the boss portion 22 is integrally formed in the central portion of the base portion 21 and extends vertically upward from the base portion 21. The boss portion 22 has a tapered through bore 20a (FIG. 5) that is adapted to rotatably receive a vertical end or connecting end 10a of the support arm 10 of the sun visor 1. Further, as shown in FIGS. 2 and 3, the boss portion 22 is vertically split (preferably, split into quarters), so as to elastically flex when the connecting end 10a of the support arm 10 is inserted into the through bore 20a. Also, as shown in for example FIG. 5, an inner flange 22a is disposed around the upper edge of the boss portion 22 and is adapted to engage an annular shoulder 10b formed in the connecting end 10a of the sun visor support arm 10, so as to prevent the connecting end 10a from slipping off.

The boss portion 22 may have three integral cantilevered engagement strips 23, 23' (two main engagement strips 23 and one supplemental engagement strip 23'), which preferably constitute the first engagement means, although the first engagement means is not limited to this particular design. These engagement strips 23, 23' are circumferentially and radially arranged on the boss portion 22, equally spaced by 120°, and are positioned so as to correspond to the centers of the three sides of the triangular base portion 21, respectively. Each of the engagement strips 23, 23' radially outwardly projects from the outer surface of the boss portion 22 and has a substantially reverse U-shaped or bow-shaped configuration. Each of the main engagement strips 23 has a lateral engagement lip 23a at its distal end that is adapted to engage the inner surface of the panel lining sheet 40 around the receiving hole 41 when the substantial portion of the bracket assembly 2 is pressed into the receiving hole 41 of the panel lining sheet 40. The lateral engagement lip 23a has a downwardly slanted upper surface 23d for easy insertion into the receiving hole 41. Moreover, each of the main engagement strips 23 has a vertical engagement wall 23b at its distal end that is adapted to engage the inner surface of the receiving hole 41 of the panel lining sheet 40 when the bracket assembly 2 is pressed into the receiving hole 41, as shown in FIG. 5. Further, as shown in the drawings, each of the engagement strips 23 has an acute-angled portion 23c, so as to radially and elastically flex when the bracket assembly 2 is inserted into the receiving hole 41 of the panel lining sheet 40. The supplemental engagement strip 23' has substantially the same construction as the main engagement strips 23 except that it does not have a vertical engagement wall that corresponds to the vertical engagement wall 23b, as shown, for example, in FIG. 3. This special construction of the supplemental engagement strip 23' permits easy control of the position of the bracket assembly 2 in the receiving hole 41 after the bracket assembly 2 is inserted into the receiving hole 41.

The upper surface of the base portion 21 preferably has three engagement members 24, which preferably constitute the second engagement means, although the second engagement means is not limited to this particular design. These engagement members 24 are circumferentially arranged around the boss portion 22, equally spaced by 120°. Moreover, the engagement members 24 are preferably positioned in such a way that thee engagement members 24 and the engagement strips 23, 23' are alternately positioned around the boss portion 22, equally spaced by 60°. That is, the engagement members 24 are arranged in such a way that the engagement members 24 correspond to the three vertexes of the triangular base portion 21, respectively.

Figure 6:
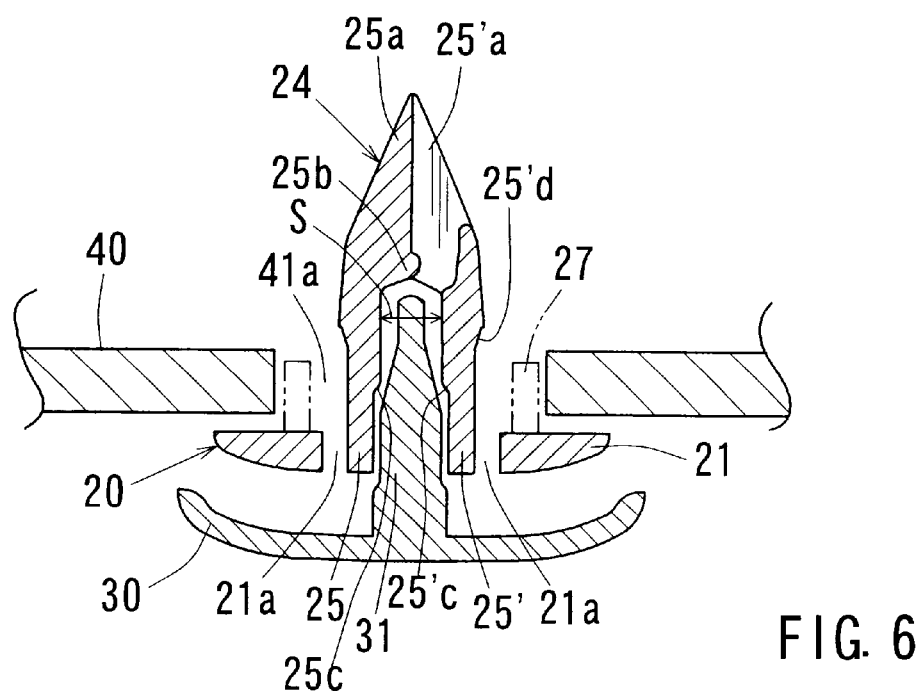
FIG. 6 is a cross-sectional view taken along line B—B of FIG. 4.
Figure 7:
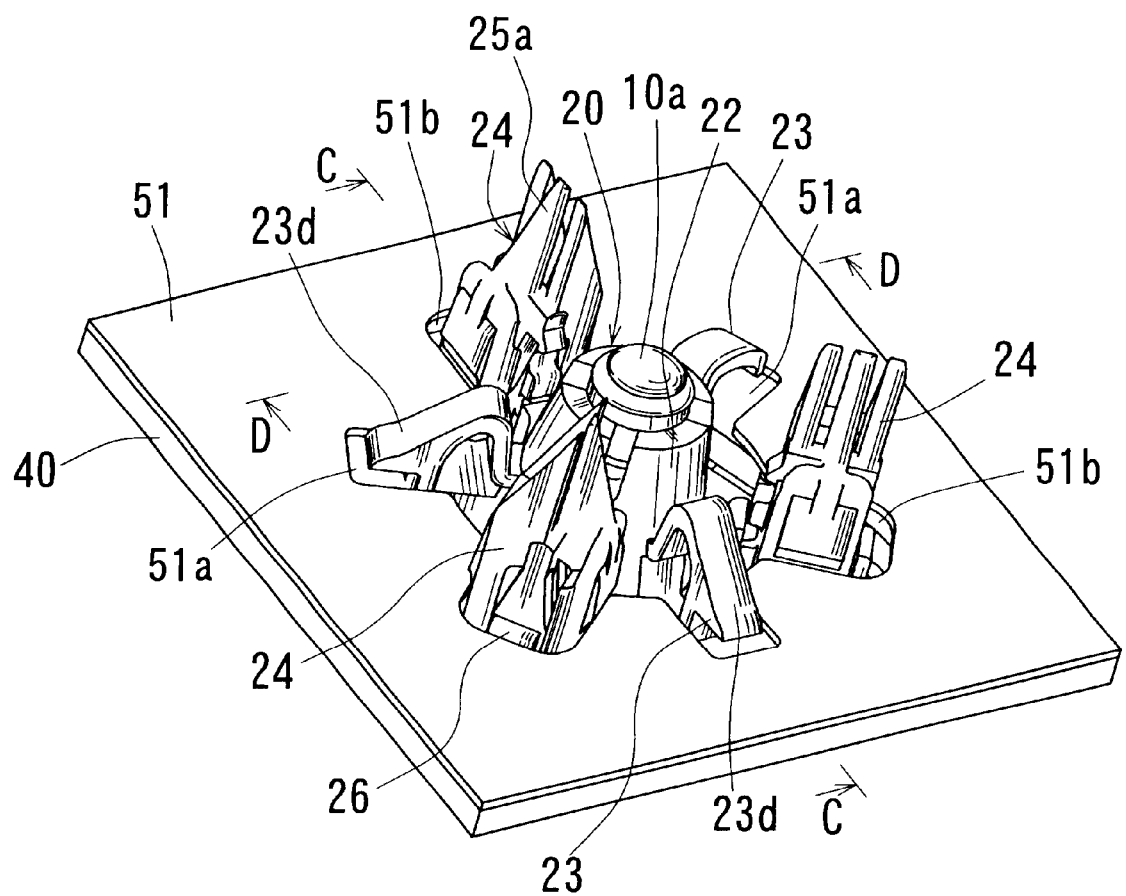
FIG. 7 is a perspective view of the representative bracket assembly after it has been attached to the front header panel with the panel lining sheet.

As shown in FIG. 6, each of the engagement members 24 comprises a pair of elongated engagement bars 25, 25' that are oppositely disposed with a spaced relationship, so as to form a receiving space S between the engagement bars 25, 25'. Each of these engagement bars 25, 25' is preferably shaped, so as to oppositely outwardly flex or spread when an outward force is applied to the engagement bars 25, 25'. This installation operation will be described below in further detail. As will be apparent from the drawings, these engagement bars 25, 25' are positioned, so as to flex in the direction substantially perpendicular to the radial direction of the boss portion 22. In addition, the base portion 21 includes through holes 21a that are adjacent to the back surfaces (outer surfaces) of the engagement bars 25, 25' in order to facilitate flexure of the engagement bars 25, 25'.

As shown in FIGS. 5 and 6, a single tapered head 25a is integrally disposed in the middle of the upper portion of the engagement bar 25. Moreover, the engagement bar 25' has a pair of laterally spaced tapered heads 25'a, which heads are integrally formed at both edges of the upper portion of the engagement bar 25'. In addition, as best shown in FIG. 5, these heads 25'a are preferably arranged, so as to receive the head 25a of the engagement bar 25 within the space formed therebetween when the engagement bars 25, 25' are inwardly oppositely flexed by application of an inward force (FIG. 9(A)). Further, the front surfaces (inner surfaces) of the heads 25a, 25'a of the engagement bars 25, 25' are coplanar in a nonoperational state of the engagement member 24. Therefore, strictly speaking, the engagement bars 25, 25' are not spaced at their heads 25a, 25'a. The engagement member 24 constructed in this manner has a wedge-like shape as a whole, which shape may facilitate insertion of the bracket assembly 2 into the mounting hole 51 of the front header panel 50, which will be described below in further detail.

The front surface of the head 25a of the engagement bar 25 has a protuberance 25b that is positioned on its lower end (FIG. 9(B)). Similarly, the front surfaces of the heads 25'a of the engagement bar 25' have protuberances 25'b that are positioned on their lower ends (FIG. 9(B)). As shown in FIG. 6, these protuberances 25b, 25'b laterally overlap each other. Further, the outer surface of the engagement bar 25 has an outer shoulder 25d that is adapted to engage the periphery of the mounting hole 51 of the front header panel 50 when the substantial portion of the bracket assembly 2 is pressed into the front header panel 50. This installation operation also will be described below in further detail. Also, the inner surface of the engagement bar 25 has an inner shoulder 25c that is positioned lower than the outer shoulder 25d. Likewise, the engagement bar 25' has an inner shoulder 25'c and an outer shoulder 25'd that correspond to the inner and outer shoulders 25c, 25d of the engagement bar 25, respectively.

The bracket cover 30 is an outermost member or ornamental member. Therefore, the bracket cover 30 is preferably shaped and sized, so as to completely cover the base portion 21 of the bracket body 20. In this embodiment, as shown in FIG. 3, the bracket cover 30 has a rounded triangular shape corresponding to the base portion 21 of the bracket body 20 and has a profile greater than the base portion 21. Thus, the bracket cover 30 completely covers the base portion 21 when the bracket assembly 2 is ultimately attached to the front header panel 50.

The upper surface (inner surface) of the bracket cover 30 has three integral locks (or locking means), which may be plate-like rectangular vertical projections 31. These projections 31 are arranged to correspond to the engagement members 24 that are provided on the base portion 21. These projections 31 function to outwardly spread or flex the engagement bars 25, 25', so that the engagement bars 25, 25' engage the periphery of the mounting hole 51 of the front header panel 50 (FIG. 9(B)), which will be described below in further detail.

As shown in FIG. 5, each of the projections 31 is flattened in the radial direction of the boss portion 22, and substantially comprises a relatively thickened base portion which portion is directly connected to the bracket cover 30, a middle portion and a relatively thin leading portion. The projection 31 further includes a shouldered transient portion that connects the thickened base portion and the middle portion and a tapered transient portion that connects the middle portion and the tapered leading portion. As will be appreciated, the tapered leading portion and the middle portion of the projections 31 are adapted be loosely received in the receiving space S between the engagement bars 25, 25'. Further, as shown in FIG. 5, the inner end surface of the projections 31 has an upper lateral engagement groove 31a and a lower lateral engagement groove 31b, which may constitute a retainer or retainer means. Preferably, these grooves are parallel to each other.

As shown in FIGS. 3 and 5, the upper surface of the base portion 21 has three integral pairs of opposed guide strips 26 adapted to guide vertical movement of the projections 31. Each pair of guide strips 26 are positioned adjacent to the engagement bars 25, 25' of each engagement members 24, so as to laterally close the receiving space S that is formed between the engagement bars 25, 25'. As will be appreciated, each pair of guide strips 26 are spaced from each other by a desired distance, so as to closely receive the projections 31 between the guide strips 26. The inner guide strip 26 has a transverse engagement rib 26a projecting toward the receiving space S, which may serve as a retainer means. The engagement rib 26a is adapted to fit or engage the engagement grooves 31a, 31b when the projection 31 is inserted into the receiving space S between the engagement bars 25, 25'.

As shown in FIGS. 5 and 6, each of the projections 31 is inserted into the receiving space S of each pair of engagement bars 25, 25', so that the engagement rib 26a of the inner guide strip 26 engages the upper engagement groove 31a. Thus, the projection 31 is temporarily retained at a first or non-operational position (FIGS. 5, 6, 8(A) and 9(A)). In this position, only the leading portion and middle portion of the projection 31 are received in the receiving space S. As a result, the bracket assembly 2 has the bracket cover 30 that is operatively retained on the bracket body 20 with a desired distance therebetween. Further, because the guide strips 26 may act as a positioner for the projection 31, each of the projections 31 can be retained on a predetermined position in the receiving space S. Thus, the projections 31 will not move in the longitudinal direction or the radial direction of the boss portion 22, which permits the bracket cover 30 to be reliably positioned on the bracket body 20.

The projection 31 can be further inserted into the receiving space S by pressing the in bracket cover 30. When the projection 31 is forced into the receiving space S by pressing the bracket cover 30 toward the bracket body 20, the inner guide strip 26 is elastically outwardly flexed. Therefore, the engagement rib 26a of the inner guide strip 26 disengages from the upper engagement groove 31a and then engages the lower engagement groove 31b. As a result, the projection 31 is retained on a second or ultimate operational position (FIGS. 8(B) and 9(B)) wherein the projection 31 is completely received within the receiving space S.

When the projection 31 is pressed into the receiving space S, the upper portion of the projection 31 progressively intervenes between the protuberances 25b, 25'b of the engagement bars 25, 25', to thereby outwardly flex the engagement bars 25, 25'. At this time, the middle portion and the base portion of the projection 31 can closely fit within the middle portion and the lower portion of the receiving space S, respectively, so that the projection 31 does not move in the lateral directions (the directions of flexing of the engagement bars 25, 25').

The inner guide strip 26 is preferably designed in such a way that the force that is required to outwardly flex the inner guide strip 26 is greater than the force that is required to flex the engagement strip 23. In addition, this force is greater than the force that is required to flex the engagement bars 25, 25'.

In addition, as shown in FIG. 3, the base portion 21 of the bracket body 20 has three slits or notches 21b. These notches 21b are disposed on the centers of the three sides of the triangular base portion 21, respectively, and extend to the boss portion 22. These notches 21b may produce stress concentration portions around the root or base of the boss portion 22, which portion may easily break when an upward external impact force is applied to the base portion 21. The stress concentration portion thereby effectively absorbs this force. Moreover, the upper surface of the base portion 21 has a plurality of stopper pins 27. These stopper pins 27 are adapted to contact the front header panel 50, so as to prevent the engagement members 24 from excessively projecting into the mounting hole 51 of the front header panel 50, when the bracket assembly 2 is pushed into the mounting hole 51.

Lastly, the receiving hole 41 of the panel lining sheet 40 and the mounting hole 51 of the front header panel 50 may respectively have a special shape. That is, the receiving hole 41 may optionally have a rounded equilateral triangular shape that substantially corresponds to the shape of the base portion 21 and may have a size smaller than the base portion 21. The receiving hole 41 may have three enlarged areas 41a that are formed around the vertexes of the triangular receiving hole 41. As a result, the engagement members 24 can pass through the receiving hole 41 without interference when the bracket assembly 2 is pushed into the receiving hole 41. On the other hand, the mounting hole 51 may have a gear-like shape and may include three release portions 51*a* and three engagement portions 51*b* that are alternately positioned, equally spaced by 60°, so as to correspond to the engagement strips 23, 23' and the engagement members 24, respectively. As will be appreciated, each release portion 51*a* is adapted to pass through the engagement strips 23, 23' without interference when the bracket assembly 2 is pushed into the mounting hole 51. To the contrary, each engagement portion 51*b* is adapted to be engageable with the engagement member 24 after the bracket assembly 2 is pushed into the mounting hole 51.

A representative method for attaching the panel lining sheet 40 to the front header panel 50 will now be described.

First, the resin molded bracket cover 30 is joined to the resin molded bracket body 20 by inserting the projections 31 provided on the bracket cover 30 into the receiving spaces S of the bracket body 20 until the engagement ribs 26*a* of the guide strips 26 engage the upper engagement grooves 31*a* of the projections 31, so as to form the bracket assembly 2.

Subsequently, the connecting end 10*a* of the support arm 10 of the sun visor 1 is inserted into the tapered through bore 20*a* of the bracket body boss portion 22 until the annular shoulder 10*b* of the connecting end 10*a* engages the inner flange 22*a* of the boss portion 22. Thus, the bracket assembly 2 is attached to the sun visor 1. Thereafter, the bracket assembly 2 attached to the sun visor 1 is positioned against the receiving hole 41 in such a way that the engagement members 24 align with the receiving hole enlarged areas 41*a*.

The bracket assembly 2 is pushed into the receiving hole 41 by pressing the bracket cover 30 toward the receiving hole 41.

When the bracket cover 30 is pressed toward the receiving hole 41, the engagement strips 23, 23' are forced into the receiving hole 41 while elastically inwardly flexing along the periphery of the receiving hole 41. Upon completion of pressing the bracket cover 30, the engagement strips 23, 23' are outwardly restored, so that the lateral engagement lips 23*a*, 23'*a* engage the inner surface of the receiving hole 41 of the panel lining sheet 40. Thus, the bracket assembly 2 (having the sun visor 1 attached thereto) is attached to the panel lining sheet 40 to thereby form the panel lining sheet assembly. The panel lining sheet assembly preferably comprises the panel lining sheet 40 and the sun visor 1, which has been joined to the panel lining sheet 40 by the bracket assembly 2.

At this time, the engagement members 24 pass through the enlarged areas 41*a* of the receiving hole 41 without interference, and project into the receiving hole 41, as shown in, for example, FIG. 6. On the other hand, the vertical engagement walls 23*b* of the engagement strips 23 engage the inner surface of the receiving hole 41 of the panel lining sheet 40. Therefore, the bracket body 20 of the bracket assembly 2 is arranged at the desired position in the receiving hole 41.

Further, the force that is required to outwardly flex the inner guide strips 26 is preferably greater than the force that is required to flex the engagement strips 23. Therefore, when the bracket cover 30 is pressed toward the receiving hole 41, the engagement ribs 26*a* of the inner guide strips 26 cannot disengage from the upper engagement grooves 31*a* before the engagement strips 23, 23' are forced into the receiving hole 41. As a result, each of the projections 31 provided on the bracket cover 30 is retained at the first position.

Subsequently, the panel lining sheet assembly is placed or overlaid on the front header panel 50, so that the bracket assembly 2 faces the mounting hole 51 of the front header panel 50, as shown by a broken lines in FIGS. 8(A) and 9(A). At this time, the bracket assembly 2 is preferably positioned in such a way that the engagement strips 23, 23' and the engagement members 24 align with the release portions 51*a* and the engagement portions 51*b* of the mounting hole 51, respectively. Thereafter, the bracket assembly 2 is pushed into the mounting hole 51 by pressing the bracket cover 30 toward the mounting hole 51 until the panel lining sheet 40 contacts the front header panel 50, as shown by solid lines in FIGS. 8(A) and 9(A).

When the bracket cover 30 is pressed toward the mounting hole 51, the engagement bars 25, 25' of the engagement members 24 are forced into the engagement portions 51*b* of the mounting hole 51. At the same time, the engagement bars 25, 25' elastically inwardly flex along the periphery of the engagement portions 51*b*, as shown by broken lines in FIG. 9(A). Upon completion of insertion of the engagement members 24, the engagement bars 25, 25' are outwardly restored, so as to engage the peripheral edges of the engagement portions 51*b* in of the mounting hole 51 at the shoulders 25*d*, 25'*d*, as shown by solid lines in FIG. 9(A). Thus, the bracket assembly 2 (having the sun visor 1 attached thereto) is provisionally or temporarily attached to the front header panel 50 and the panel lining sheet 40 is interposed between the front header panel 50 and the base portion 21 of the bracket body 20.

Further, the force that is required to outwardly flex the inner guide strips 26 is preferably greater than the force that is required to flex the engagement bars 25, 25'. Therefore, when the bracket cover 30 is pressed toward the mounting hole 51 of the front header panel 50, the engagement ribs 26*a* of the inner guide strips 26 cannot disengage from the upper engagement grooves 31*a* before the engagement bars 25, 25' are forced into the engagement portions 51*b* of the mounting hole 51. Consequently, each of the projections 31 provided on the bracket cover 30 is retained at the first position.

At this time, these engagement members 24 can be reliably introduced into the engagement portions 51*b* of the mounting hole 51, even if the engagement members 24 misalign with the engagement portions 51*b* of the mounting hole 51, because each of the engagement members 24 has a wedge-like shape. Further, the engagement strips 23, 23' easily pass through the release portions 51*a* of the mounting hole 51 without interference, and project from the inner surface of the front header panel 50. In addition, the stopper pins 27 contact the outer surface of the front header panel 50, to thereby prevent the engagement members 24 from excessively projecting into the mounting hole 51, as shown in FIGS. 9(A) and 9(B).

Thereafter, a more substantial pressing force is applied to the bracket cover 30 to complete the fixing or attaching operation of the bracket assembly 2. Upon application of the more substantial pressing force to the bracket cover 30, as shown in FIG. 8(B), the engagement ribs 26*a* of the inner guide strips 26 disengage from the upper engagement grooves 31*a* and then engage the lower engagement grooves 31*b*. Therefore, the projections 31 are shifted to and retained at the second operating positions. At this time, as shown in FIG. 9(B), the leading portions of the projections 31 project between protuberances 25b, 25'b of the engagement bars 25, 25', to thereby outwardly flex the engagement bars 25, 25'. As a result, the engagement bars 25, 25' reliably engage the peripheral edges of the engagement portions 51b of the mounting hole 51 at the shoulders 25d, 25'd. That is, the flexed engagement bars 25, 25' cooperate with the stopper pins 27 to hold the front header panel 50 between the engagement bars 25, 25' and the stopper pins 27 to thereby secure the bracket body 20 to the front header panel 50. Consequently, the bracket assembly 2 is attached to the front header panel 50, so as to attach the sun visor 1 to the front header panel 50. Further, the panel lining sheet 40 is interleaved between the front header panel 50 and the base portion 21 of the bracket body 20. Thus, the panel lining sheet 40 is attached to the front header panel 50 by the attached sun visor 1.

Further, when the projections 31 are shifted to the second operating positions, the middle portions and the base portions of the projections 31 contact corresponding parts of the engagement bars 25, 25', respectively, to thereby outwardly bias the engagement bars 25, 25'. As a result, the engagement force of the engagement bars 25, 25' is increased. In addition, at this time, the cover plate 30 contacts the panel lining sheet 40, so as to completely cover the bracket body 20.

Because the middle portions and the base portions of the projections 31 contact the engagement bars 25, 25', respectively, the projections 31 are effectively prevented from moving in the lateral directions. Moreover, because the projections 31 are closely received between the guide strips 26, the projections 31 are prevented from moving in the widthwise directions. As a result, the cover plate 30 cannot be moved after the bracket assembly 2 is fixed.

The bracket assembly 2 according to the first detailed representative embodiment may exhibit following effects and advantages because of its structural feature.

The bracket assembly 2, which is coupled to the sun visor 1, can be easily joined to the panel lining sheet 40, so as to produce the panel lining sheet assembly. That is, the panel lining sheet assembly can be formed by forcing the engagement strips 23, 23' of the bracket assembly 2 into the receiving hole 41. This operation is performed in one operation by simply pressing the bracket cover 30 toward the receiving hole 41. As a result, time-consuming work is not required to prepare the panel lining sheet assembly.

The produced panel lining sheet assembly can be easily attached to the front header panel 50 by engaging the engagement bars 25, 25' with the peripheral edges of the engagement portions 51b of the mounting hole 51. This attaching operation can be performed by forcing the engagement member 24 into the engagement portions 51b of the mounting hole 51 after the panel lining sheet assembly is overlaid on the front header panel 50, and then by shifting the projections 31 to the second operating positions. That is, this operation can be performed in one step by pressing the bracket cover 30 toward the mounting hole 51. Therefore, time-consuming and labor intensive work is not necessary to attach the panel lining sheet assembly to the front header panel 50.

The bracket assembly 2 comprises only the resin molded bracket body 20 and the resin molded bracket cover 30. In addition, the bracket cover 30 can be combined with the bracket body 20 by simply inserting the projections 31 provided on the bracket cover 30 into the receiving spaces S without any aligning operation. Therefore, the bracket assembly 2 can be easily manufactured at low cost.

The bracket assembly 2 can achieve some degree of two-dimensional horizontal movement on the panel lining sheet 40, because the bracket assembly 2 is retained by engaging the flexible engagement strips 23, 23' with the receiving hole 41 of the panel lining sheet 40. Therefore, even if misalignment between the receiving hole 41 and the mounting hole 51 results when the panel lining sheet assembly is overlaid on the front header panel 50, such misalignment can be easily absorbed by appropriate flexure of the engagement strips 23, 23'. Thus, the engagement members 24 can be introduced into the engagement portions 51b of the mounting hole 51 to engage with the engagement portions 51b. As a result, the bracket assembly 2 can be attached to the mounting hole 51 regardless of misalignment between the receiving hole 41 of the panel lining sheet 40 and the mounting hole 51 of the front header panel 50.

The bracket assembly 2 can be properly stabilized on the panel lining sheet 40 when attached thereto, because the three engagement strips 23, 23' are circumferentially arranged on the boss portion 22, spaced by 120°. Moreover, the bracket assembly 2 can be reliably fixed to the front header panel 50 when attached thereto, because the three engagement members 24 are arranged on the base portion 21 around the boss portion 22, spaced by 120°.

As previously described, the base portion 21 has the three notches 21b, so as to form the stress concentration portions at the junction of the base portion 21 and the boss portion 22. Therefore, the bracket assembly 2 may easily break at these stress concentration portions when and external impact force is applied to the base portion 21 in order to effectively absorb the impact force. For example, when a passenger accidentally strikes the sun visor 1 that is attached to the front header panel 50 by the bracket assembly 2, the bracket assembly 2 breaks at the stress concentration portions, so as to absorb the impact force. As a result, when a traffic collision or other such accident occurs, the risk of fatal injuries due to a secondary collision can be substantially reduced or prevented.

Further, various changes and modifications may be made to the present teachings without departing from the scope of the invention. For example, the engagement members 24 may have a structure similar to the engagement strips 23. In addition, the retainer means can be any type of structure that performs the function of engaging the projections 31 with the guide strips 26. Therefore, the retainer means is not limited to the engagement grooves 31a, 31b and the engagement ribs 26a.

SECOND DETAILED REPRESENTATIVE EMBODIMENT

Figure 13:
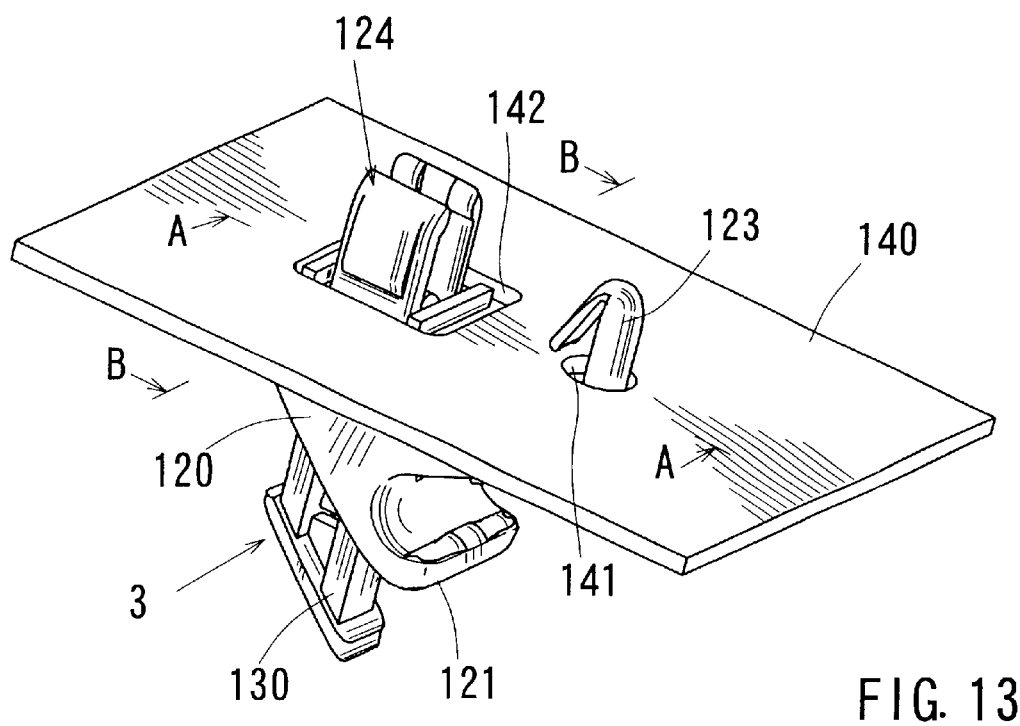
FIG. 13 is a perspective view of the representative sun visor holder unit after it has been attached to the panel lining sheet.
Figure 14:
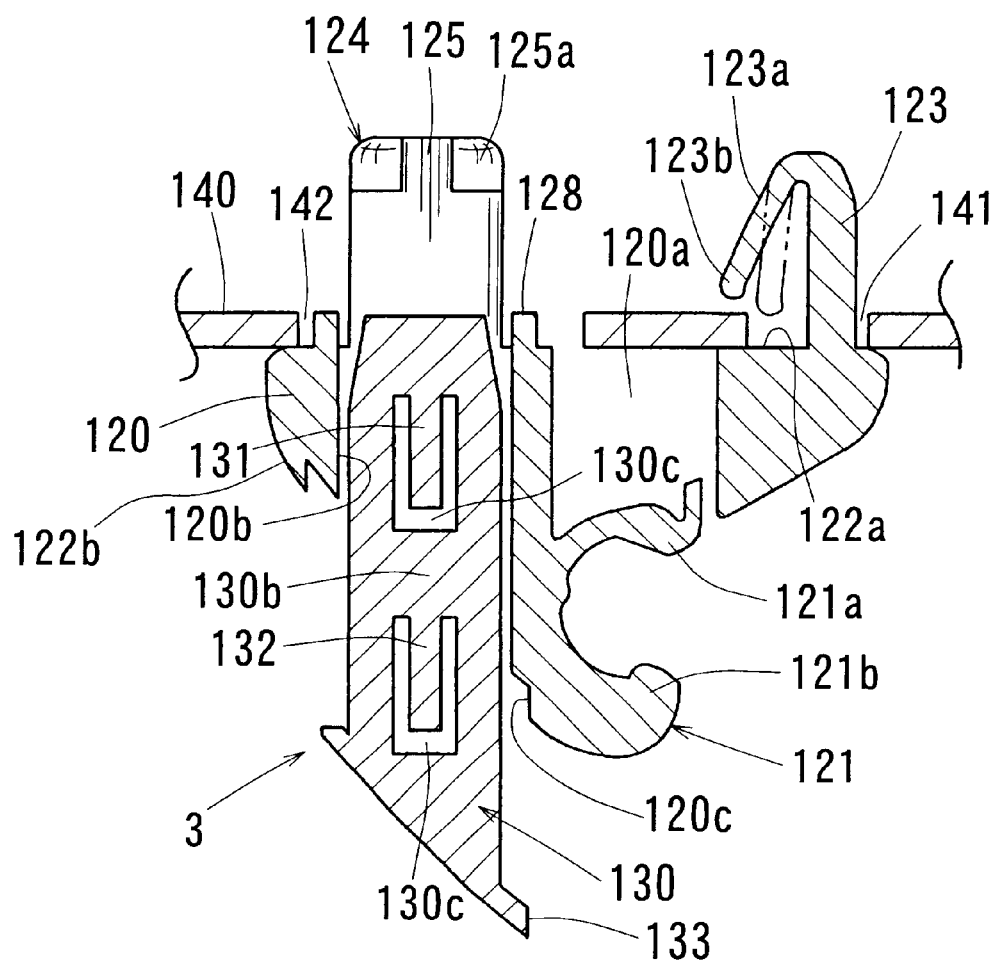
FIG. 14 is a cross-sectional view taken along line A—A of FIG. 13.

The second detailed representative embodiment will now be described in further detail with reference to FIGS. 10–19. As shown in FIG. 11, the sun visor holder unit 3 may include a resin molded block-like main body 120 and a lock (or locking means), such as resin molded locking stick 130. The main body 120 may have a substantially reverse triangular configuration in side view, a flattened upper attachment surface 122a and an inclined lower surface 122b. Further, the main body 120 may include an integrally formed holder hook or hooked portion 121, which portion is located between the two surfaces 122a, 122b. The hooked portion 121 is adapted to receive the retainer portion 110a of the sun visor 101. Therefore, strictly speaking, the sun visor holder unit 3 in this embodiment can be defined as a combination of the attachment device and the sun visor holder. The main body 120 has a rectangular through bore 120a, which bore extends from the attachment surface 122a toward the hooked portion 121, so as to substantially align thereto. As shown in FIG. 14, the hooked portion 121 comprises a thickened main strip 121b and an opposed thinner flexible auxiliary strip 121a. The auxiliary strip 121a may elastically flex upwardly so as to releasably clamp the retainer portion 110a of the sun visor 101. The auxiliary strip 121a preferably has a dimension smaller than the cross section of the through bore 120a, so as to sufficiently flex without interfering with the main body 120 when the retainer portion 110a of the sun visor 101 is fitted into the hooked portion 121.

The attachment surface 122a of the main body 120 may have an integral first engagement means or engagement strip 123 that is positioned on one side of the through bore 120a. The engagement strip 123 is adapted to engage the receiving hole 141 of the panel lining sheet 140, when it is pressed into the receiving hole 141. The engagement strip 123 projects vertically (perpendicularly) from the attachment surface 122a and has a flexible engagement lip 123a that extends downwardly at an angle from the distal end of the engagement strip 123. As shown in FIGS. 13 and 14, the engagement strip 123 is engaged to the receiving hole 141 by elastically engaging the distal end 123b of the engagement lip 123a with the inner surface of the panel lining sheet 140.

Further, the attachment surface 122a of the main body 120 may have an integral second engagement means or engagement member 124 that is positioned on the other side of the through bore 120a. The engagement member 124 projects vertically (perpendicularly) from the attachment surface 122a and is adapted to engage the mounting hole 151 of the front header panel 150 when it is pressed into the mounting hole 151. The engagement member 124 comprises a pair of elastically flexible flattened engagement bars 125 that are transversely oppositely disposed in a spaced relationship, so as to form a receiving space S between the engagement bars 125.

Each of the engagement bars 125 has an outer surface that preferably upwardly slant toward its distal end to form a tapered leading end, in order to facilitate insertion of the engagement member 124 into the mounting hole 151 of the front header panel 150. Further, the outer surface of the engagement bar 125 may have a shoulder portion 125b that is adjacent to its proximal end. The shoulder portion 125b is adapted to engage the periphery of the mounting hole 151 when the engagement bars 125 are outwardly flexed, which will be described below in further detail. Also, each of the engagement bars 125 has a flattened inner surface that has a pair of projections 125a. These projections 125a are arranged along the distal end edge.

In addition, the attachment surface 122a of the main body 120 is integrally provided with a pair of stopper bars 128. These stopper bars 128 are adapted to contact the front header panel 150 when the engagement member 124 is pushed into the mounting hole 151, so as to prevent the engagement member 124 from excessively projecting into the mounting hole 151 of the front header panel 150.

Figure 15:
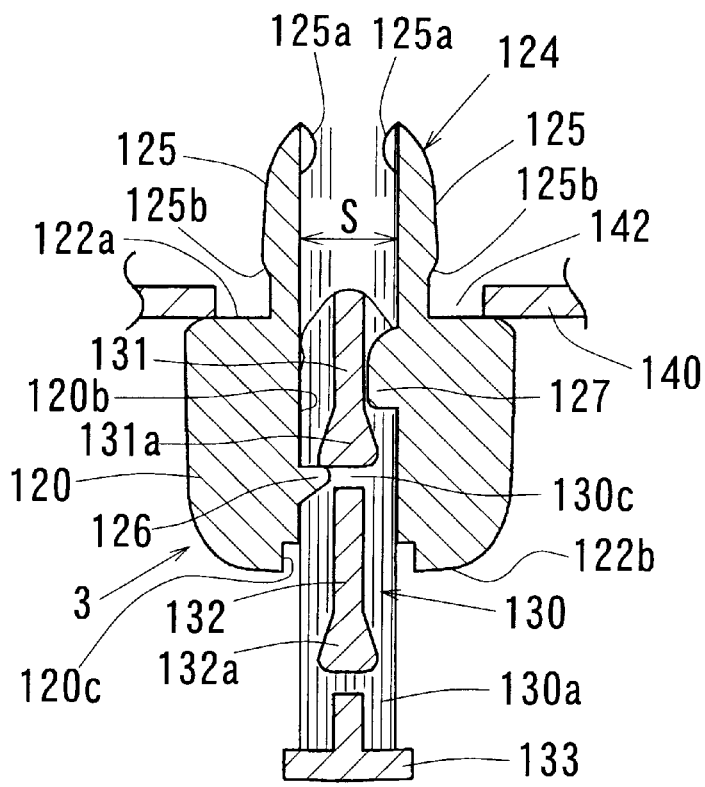
FIG. 15 is a cross-sectional view taken along line B—B of FIG. 13.
Figure 16:
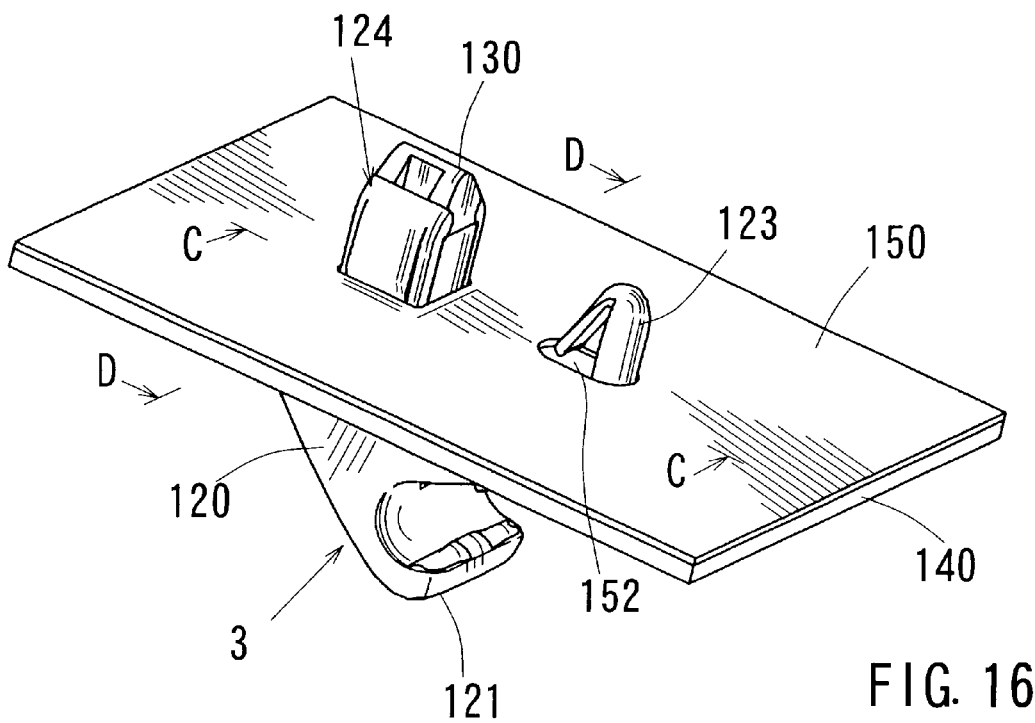
FIG. 16 is a perspective view of the representative sun visor holder unit after it has been attached to the front header panel with the panel lining sheet.
Figure 17:
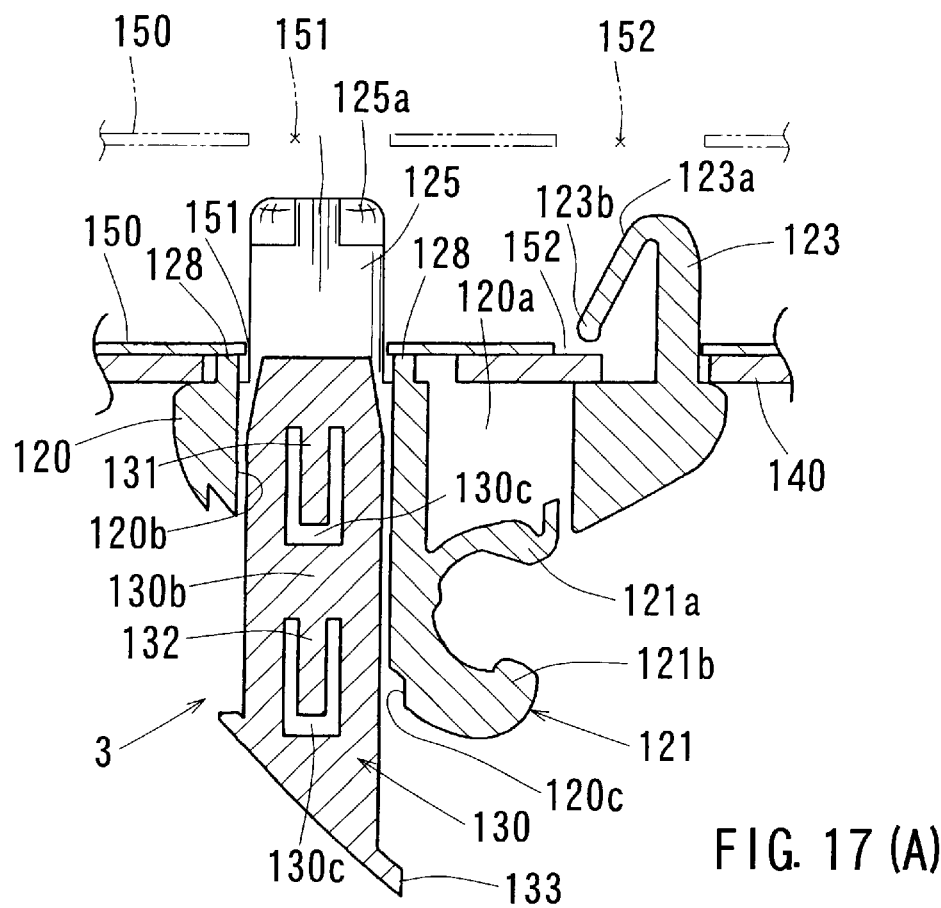
FIG. 17(A) is a cross-sectional view taken along the C—C of FIG. 16 before an engagement pin of a bracket cover is inserted between engagement strips of a bracket body.
FIG. 17(B) is a cross-sectional view taken along line C—C of FIG. 16 after the engagement pin is inserted between the engagement strips.
Figure 17:
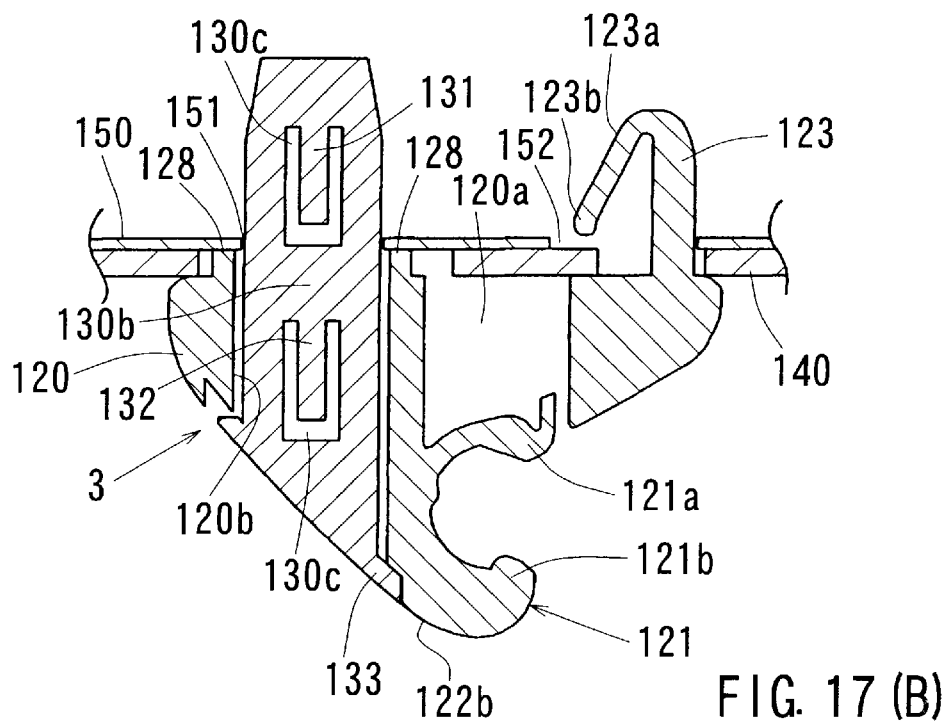
Figure 18:
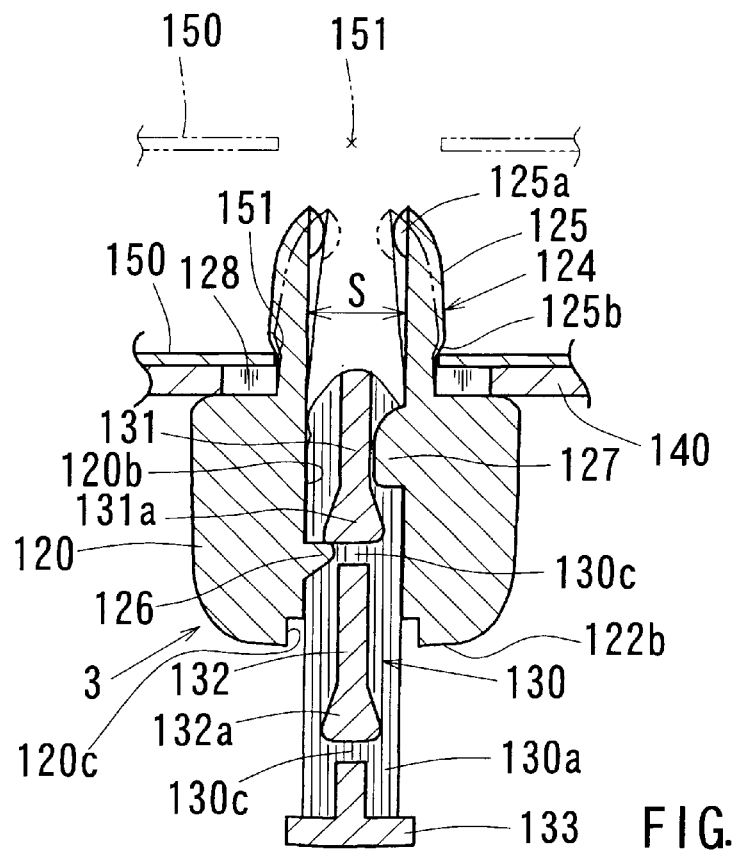
FIG. 18(A) is a cross-sectional view taken along line D—D of FIG. 16 before the engagement pin is inserted between the engagement strips.
FIG. 18(B) is a cross-sectional view taken along line D—D of FIG. 16 after the engagement pin is inserted between the engagement strips.
Figure 18:
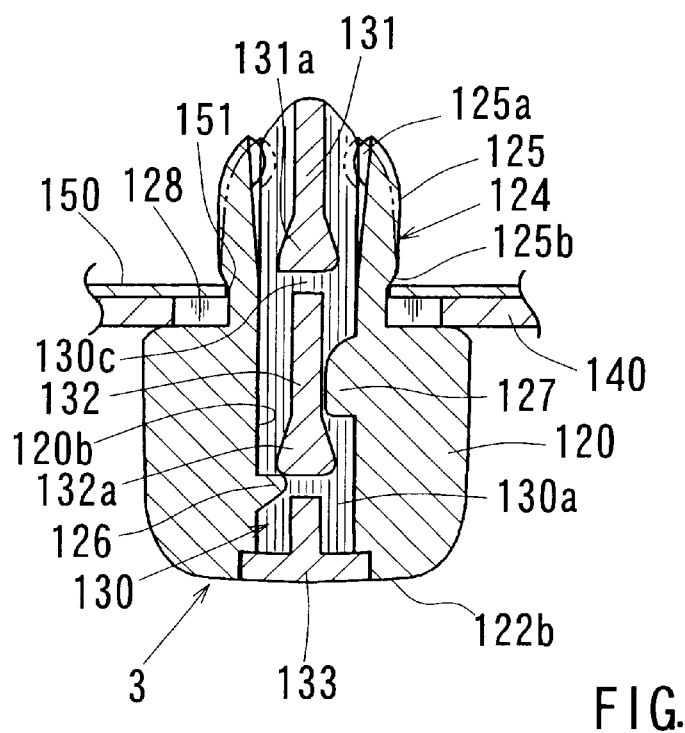

As shown in FIG. 15, the main body 120 has a guide bore or rectangular through bore 120b that extends from the upper surface 122a to the lower surface 122b. The through bore 120b vertically movably receives the locking stick 130. The locking stick 130 functions to outwardly spread or flex the engagement bars 125. When the locking stick 130 is pressed into the receiving space S of the engagement member 124, the engagement bars 125 will engage the periphery of the mounting hole 151 of the front header panel 150 (FIG. 18(B)), which operation will be described below in further detail.

As shown in FIGS. 18(A) and 18(B), the through bore 120b is substantially aligned with the engagement member 124 and has a width identical (or substantially identical) to the receiving space S of the engagement member 124. In other words, the through bore 120b has a pair of opposed inner surfaces that are coplanar with the inner surfaces of the engagement bars 125. One of these opposed inner surfaces of the through bore 120b is integrally formed with an engagement projection 126, which may serve as a retainer means. The other surface of these opposed inner surfaces of the through bore 120b is integrally formed with a restriction projection 127 that is positioned higher than the engagement projection 126.

Figure 19:
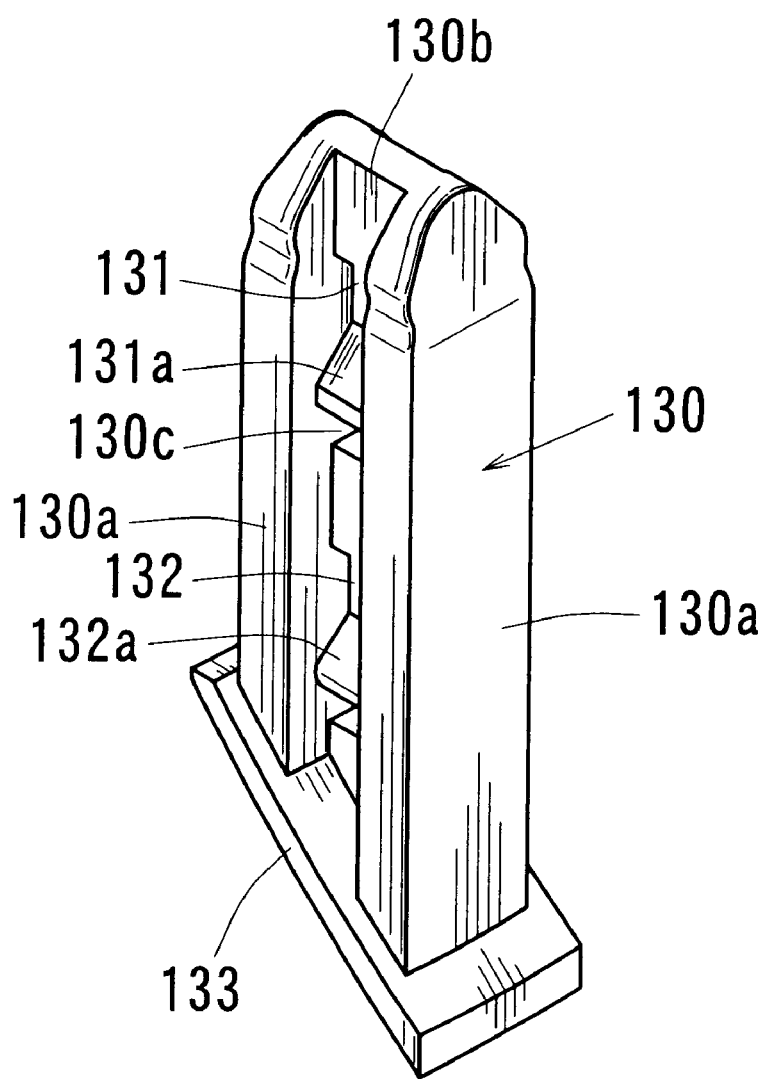
FIG. 19 shows a locking stick of the second representative embodiment.

As shown in FIG. 19, the locking stick 130 preferably is an integrally formed rod-like member having a symmetrical H-shape in transverse cross section. The locking stick 130 comprises a cover member or base plate 133, a pair of opposed side walls 130a that are integral and project upwardly (perpendicularly) from the base plate 133, and a web member 130b interconnecting the side walls 130a.

Each of the side walls 130a has a tapered head portion and has a width substantially identical to the receiving space S of the engagement member 124. The web member 130b has upper and lower U-shaped omitted portions (recesses) 130c, to thereby form a first or upper flexible strip 131 and a second or lower flexible strip 132. These strips 131, 132 are thicker at their lower ends, so as to respectively form lower flared portions 131a, 132a, which may serve as the retainer means.

As shown in FIGS. 14 and 15, the locking stick 130 is inserted into the through bore 120b of the main body 120, so that the flared portion 131a of the first strip 131 rests on the engagement projection 126. Thus, the locking stick 130 is temporarily retained at a first or non-operational position (FIGS. 14, 15, 17(A) and 18(A)). Preferably, the upper half of the locking stick 130 is received in the through bore 120b to thereby form the sun visor holder unit 3. Further, when the flared portion 131a rests on the engagement projection 126, the restriction projection 127 contacts the upper surface of the flared portion 131a, to thereby prevent further insertion of the locking stick 130. Therefore, the locking stick 130 can be retained at the first position in the through bore 120b, unless an additional force is applied to the locking stick 130 that may flex the first strip 131.

The locking stick 130 can be further inserted into the through bore 120b by pressing the base plate 133. As will be appreciated, when the locking stick 130 is forced into the through bore 120b, the first strip 131 is elastically transversely flexed by means of the restriction projection 127, so that the flared portion 131a of the first strip 131 moves upwardly moves the restriction projection 127. When the locking stick 130 is further forced into the through bore 120b (after the first strip flared portion 131a has passed through the restriction projection 127), the second strip 132 is elastically flexed by means of the engagement projection 126. Therefore, the flared portion 132a of the second strip 132 moves upwardly over the engagement projection 126. When the flared portion 132a passes through the engagement projection 126, the second strip 132 is elastically restored, so that the flared portion 132a rests on the engagement projection 126. As a result, the locking stick 130 is retained at a second or ultimate operational position (FIGS. 17(B) and 18(B)) and the locking stick 130 is completely received within the through bore 120b.

When the locking stick 130 is pressed into the through bore 120b, the upper portion or leading portion of the locking stick 130 is progressively introduced into the receiving space S of the engagement member 124. At this time, the upper portions of the side walls 130a of the locking stick 130 may cooperate with the projections 125a of the engagement bars 125, so as to outwardly flex the engagement bars 125.

In addition, the lower surface 122b of the main body 120 has an annular recess 120c that encircles the through bore 120b. The annular recess 120c preferably has a shape and a depth complementary to the base plate 133 of the locking stick 130. Thus, the outer surface of the base plate 133 is substantially coplanar with the lower surface 122b of the main body 120 when the locking stick 130 is completely inserted into the through bore 120b.

Lastly, as shown in FIG. 11, the panel lining sheet 140 has a rectangular hole 142. The hole 142 may have any appropriate dimension and is preferably located in such a way that the engagement member 124 can pass through hole 142 without interference when the engagement strip 123 is pushed into the receiving hole 141. On the other hand, the front header panel 150 has an oval hole 152. The hole 152 also may have any appropriate dimension and is preferably located in such a way that the engagement strip 123 can pass through hole 152 without interference when the engagement member 124 is inserted into the mounting hole 151.

A representative method for attaching the panel lining sheet 140 to the front header panel 150 will now be described.

First, the resin molded locking stick 130 is joined to the resin molded main body 120. That is, the locking stick 130 is inserted into the through bore 120b of the bracket body 20 until the flared portion 131a of the first strip 131 rests on the engagement projection 126 formed in the through bore 120b, to thereby form the sun visor holder unit 3.

Thereafter, the resulting sun visor holder unit 3 is positioned against the panel lining sheet 140 in such a way that the engagement strip 123 and the engagement member 124 align with the receiving hole 141 and the rectangular hole 142, respectively. Subsequently, the engagement strip 123 is pushed into the receiving hole 141 by pressing the main body 120 towards the panel lining sheet 140.

When the main body 120 is pressed toward the panel lining sheet 140, the engagement strip 123 is forced into the receiving hole 141 while elastically inwardly flexing the engagement lip 123a. Upon completion of engagement strip insertion, the engagement lip 123a is outwardly restored, so that the distal end 123b of the engagement lip 123a contacts the inner surface of the panel lining sheet 140. Further, at this time, the engagement member 124 passes through the rectangular hole 142 without interfering with its periphery, and projects into the rectangular hole 142, as shown in FIG. 13. Thus, the sun visor holder unit 3 is attached to the panel lining sheet 140, to thereby form the panel lining sheet assembly that comprises the sun visor holder unit 3 and the panel lining sheet 140, as shown in FIGS. 13 and 14.

Subsequently, the resulting panel lining sheet assembly is placed or overlaid on the front header panel 150 in such a way that the engagement member 124 and the engagement strip 123 align with the mounting hole 151 and the oval hole 152, respectively. Thereafter, the main body 120 is pressed toward the front header panel 150 until the panel lining sheet 140 contacts the front header panel 150, so that the engagement member 124 is pushed into the mounting hole 151, as shown by solid lines in FIGS. 17(A) and 18(A).

When the engagement member 124 is pressed into the mounting hole 151, the engagement bars 125 of the engagement member 124 are forced into the mounting hole 151 while elastically inwardly flexing along the periphery of the mounting hole 151, as shown by broken lines in FIG. 18(A). Upon completion of insertion of the engagement member 124, the engagement bars 125 are outwardly restored, so as to engage the peripheral edges of the mounting hole 151 at the shoulders 125b, as shown by solid lines in FIG. 18(A). Thus, the sun visor holder unit 3 is provisionally or temporarily attached to the front header panel 150 and the panel lining sheet 140 is interleaved between the front header panel 150 and the main body 120.

At this time, this engagement member 124 can be easily introduced into the mounting hole 151, even if the engagement member 124 is not properly aligned with the mounting hole 151, because the engagement member 124 has a wedge-like shape. Further, the engagement strip 123 easily passes through the oval hole 152 without interfering with the periphery of the oval hole 152. Thus, the engagement strip 123 projects from the inner surface of the front header panel 150. In addition, the stopper bars 128 contact the outer surface of the front header panel 150, to thereby prevent the engagement member 124 from excessively projecting into the mounting hole 151, as shown in FIGS. 17(A) to 18(B).

Thereafter, the base plate 133 of the locking stick 130 is upwardly pressed, in order to further insert the locking stick 130 into the through bore 120b. When a substantial pressing force is applied to the base plate 133, the locking stick 130 is forced into the through bore 120b. During this operation, the restriction projection 127 and the engagement projection 126 sequentially flex the first strip 131 and the second strip 132, respectively. Therefore, the flared portion 131a and the flared portion 132a successively pass through the restriction projection 127 and the engagement projection 126, respectively. Once the flared portion 132a passes through the engagement projection 126, the second strip 132 is elastically restored, so that the flared portion 132a rests on the engagement projection 126. As a result, the locking stick 130 is reliably retained at the second position (FIGS. 17(B) and 18(B)).

When the locking stick 130 is forced into the through bore 120b until the flared portion 132a rests on the engagement projection 126, the upper portion of the locking stick 130 projects into the receiving space S of the engagement member 124. At this time, as shown in FIG. 18(B), the upper portions of the locking stick side walls 130a cooperate with the projections 125a of the engagement bars 125, to thereby outwardly flex the engagement bars 125. As a result, the shoulder portions 125b of the engagement bars 125 reliably engage the periphery of the mounting hole 151. That is, the flexed engagement bars 125 cooperate with the stopper bars 128 to hold the front header panel 150 between the engagement bars 125 and the stopper bars 128, to thereby secure the main body 120 to the front header panel 150. Consequently, the sun visor holder unit 3 is fixed to the front header panel 150 and the panel lining sheet 140 is interposed between the front header panel 150 and the attachment surface 122a of the main body 120. Thus, the panel lining sheet 140 is attached to the front header panel 150 by the attached sun visor holder unit 3.

Further, when the locking stick 130 is shifted to the second operational position, the base portion 133 is received in the annular recess 120c formed in the main body 120. Thus, the outer surface of the base plate 133 is substantially coplanar with the lower surface 122b of the main body 120.

The sun visor holder unit 3 according to the present embodiment may exhibit following effects and advantages.

The sun visor holder unit 3 can be easily combined with the panel lining sheet 140, so as to produce the panel lining sheet assembly. That is, the panel lining sheet assembly can be formed by forcing the engagement strip 123 of the main body 120 into the receiving hole 141. This operation is performed in one step by simply pressing the main body 120 against the panel lining sheet 140. As a result, time-consuming work is not required to prepare the panel lining sheet assembly.

The produced panel lining sheet assembly can be easily attached to the front header panel 150 by engaging the engagement bars 125 of the engagement member 124 with the periphery of the mounting hole 151. This attaching operation can be performed by forcing the engagement member 124 into the mounting hole 151 after the panel lining sheet assembly is overlaid on the front header panel 150, and then by pushing the locking stick 130 into the through bore 120b of the main body 120. That is, this operation can be performed very easily. Therefore, time-consuming and labor intensive work is not necessary to attach the panel lining sheet assembly to the front header panel 150.

The sun visor holder unit 3 comprises only the resin molded main body 120 and the resin molded locking stick 130. In addition, the locking stick 130 can be combined with the main body 120 by simply inserting the locking stick 120 into the through bore 120b provided on the main body 120. Therefore, the sun visor holder unit 3 can be easily manufactured at low cost.

Finally, various changes and modifications may be made to the present teachings without departing from the scope of the invention. For example, if the sun visor holder unit 3 is not required be provisionally or temporarily retained on the front header panel 150, the engagement bars 125 may be modified. For example, the engagement bars 125 can be modified to permit smooth introduction of the engagement bars 125 into the mounting hole 151 without inward flexure when pressed into the mounting hole 151. Further, the retainer means for retaining the locking stick 130 at the first and second positions may be modified, if desired. For example, the positioning means of the locking stick 130 is not limited to the flattened portions 131a, 132a formed in the first and second strips 131, 132 and the corresponding projection 126 formed in the through bore 120b.

What is claimed is:

1. An attachment device adapted to attach a lining sheet to a panel comprising:
   a main body,
   a first engagement means extending from the main body, wherein the first engagement means is adapted to selectively engage a receiving hole of the lining sheet, but does not engage a mounting hole of the panel and
   a second engagement means extending from the main body, wherein the second engagement means is adapted to engage the mounting hole of the panel.

2. An attachment device as defined in claim 1, wherein the first engagement means comprises a flexible engagement strip, wherein the flexible engagement strip is adapted to elastically engage the receiving hole of the lining sheet so as to retain the main body on the lining sheet.

3. An attachment device as defined in claim 2, wherein the second engagement means comprises a flexible engagement member, wherein the flexible engagement strip is adapted to elastically engage the mounting hole of the panel, so as to secure the main body to the panel with the lining sheet is interleaved between the attachment device and the panel.

4. An attachment device as defined in claim 3, wherein the engagement strip comprises an engagement lip that is adapted to elastically engage the receiving hole of the lining sheet.

5. An attachment device as defined in claim 4, wherein the engagement strip further comprises an acute-angled portion, wherein the engagement strip is adapted to elastically flex when it is inserted into the receiving hole of the lining sheet.

6. An attachment device as defined in claim 3, wherein the engagement member comprises a pair of engagement bars that are oppositely disposed in a spaced relationship, wherein the engagement bars are adapted to elastically engage the mounting hole of the panel.

7. An attachment device as defined in claim 6, further comprising a lock that is adapted to be received between the engagement bars, wherein the engagement bars will spread when the lock is inserted in the space between the engagement bars and the lock shifts from a non-operational position to an operational position, wherein the engagement bars reliably engage the mounting hole of the panel.

8. An attachment device as defined in claim 7, further comprising a cover member and the lock is provided on the cover member, wherein the lock will insert into the space between the engagement bars when the cover member is pressed toward the main body.

9. An attachment device as defined in claim 7, further comprising a retainer adapted to retain the lock in the operational position and the non-operational position.

10. An attachment device as defined in claim 3, wherein the first engagement means comprises three flexible engagement strips that are equally spaced by 120°.

11. An attachment device as defined in claim 3, wherein the second engagement means comprises three flexible engagement members that are equally spaced by 120°.

12. An attachment device as defined in claim 9, wherein the retainer comprises an engagement rib provided on the main body and two engagement grooves provided on the lock, wherein the engagement rib is adapted to engage the engagement grooves, to thereby retain the lock in the operational position or the non-operational position.

13. A sun visor mounting bracket comprising the attachment device as defined in claim 1, wherein the main body comprises a base portion and a split tubular boss portion that is integrally formed on the base portion, the tubular boss portion being adapted to receive a support arm of a sun visor.

14. A sun visor mounting bracket as defined in claim 13, further comprising a retainer having an engagement rib provided on the main body and two engagement grooves provided on the lock, wherein the engagement rib is adapted to engage the engagement grooves, to thereby retain the lock in an operational position or a non-operational position.

15. A sun visor holder unit comprising the attachment device as defined in claim 1 wherein the main body comprises an integral holder hook that is adapted to receive a retainer portion of a sun visor.

16. An attachment device as defined in claim 1, wherein the attachment device is adapted to attach a vehicle lining sheet to a vehicle panel.

17. A method of attaching a lining sheet to a panel comprising:
   engaging a first engagement means provided on a main body of an attachment device with a receiving hole of the lining sheet, thereby forming a lining sheet assembly that comprises the lining sheet and the attachment device,
   placing the lining sheet assembly proximal to the panel and
   engaging a second engagement means provided on the main body with a mounting hole of the panel, wherein the lining sheet is interleaved between the attachment device and the panel.

18. A method as defined in claim 17, wherein the attachment device is a sun visor mounting bracket, and the method comprises coupling the sun visor mounting bracket to a support arm of a sun visor, wherein the lining sheet assembly includes the sun visor.

19. A method as defined in claim 17, wherein the attachment device is a sun visor holder unit, the main body has an integral a holder hook and the method further comprises receiving a retainer portion of a sun visor within the holder hook.

20. An apparatus adapted to connect an accessory to a panel with a lining sheet interleaved between the accessory and the panel comprising:

a main body comprising a base having at least one hole, at least one cantilevered engagement strip radially extending from the main body comprising a lip adapted to selectively engage a peripheral edge of a hole in the lining sheet, the engagement strip comprising an acute angled-portion adapted to radially flex when the apparatus is inserted into the lining sheet hole, at least one engagement member extending substantially perpendicularly from the base, the engagement member comprising a pair of elongated engagement bars forming a space between the engagement bars, wherein the engagement bars are arranged to enter the base hole, wherein at least one engagement bar comprises a shoulder portion adapted to engage a mounting hole in the panel and wherein the engagement strip and the main body are adapted to first engage the lining sheet and thereafter engagement member and main body are adapted to engage the panel, wherein the engagement strip does not engage the mounting hole in the panel.

21. An apparatus as defined in claim 20, wherein the main body further comprises a tubular boss portion extending substantially perpendicularly from the base, the boss portion comprising a tapered thorough hole that is adapted to receive a portion of the accessory, wherein the at least one engagement strip extends substantially radially from the boss portion.

* * * * *